(12) United States Patent
Ross

(10) Patent No.: US 11,774,368 B2
(45) Date of Patent: Oct. 3, 2023

(54) LIGHT TABLE APPARATUS AND METHODS FOR INSPECTING HEAT EXCHANGER PLATES FOR DEFECTS USING LIGHT

(71) Applicant: Rick Ross, Lebanon (SE)

(72) Inventor: Rick Ross, Lebanon (SE)

(*) Notice: Subject to any disclaimer, the term of this patent is extended or adjusted under 35 U.S.C. 154(b) by 117 days.

(21) Appl. No.: 17/567,630

(22) Filed: Jan. 3, 2022

(65) Prior Publication Data

US 2023/0213455 A1   Jul. 6, 2023

(51) Int. Cl.
   *G01N 21/88*   (2006.01)
   *G01N 21/91*   (2006.01)
   *G01N 21/95*   (2006.01)

(52) U.S. Cl.
   CPC ......... *G01N 21/8803* (2013.01); *G01N 21/91* (2013.01); *F28F 2200/00* (2013.01); *G01N 2021/9516* (2013.01)

(58) Field of Classification Search
   CPC ........ G01N 21/84; G01N 21/86; G01N 21/88; G01N 21/8803; G01N 21/8806; G01N 21/89; G01N 21/8901; G01N 21/8914; G01N 21/892; G01N 21/8921; G01N 21/8922; G01N 21/894; G01N 21/898; G01N 21/90; G01N 21/9054; G01N 21/91; G01N 21/94; G01N 21/95; G01N 21/9515; G01N 21/956; G01N 21/95684; G01N 21/95692; G01N 2021/8809; G01N 2021/8816; G01N 2021/8835; G01N 2021/8841; G01N 2021/8854; G01N 2021/8858; G01N 2021/8861;
   (Continued)

(56) References Cited

U.S. PATENT DOCUMENTS 2,820,908 A   1/1958   Linderman
3,341,709 A   9/1967   Binks
   (Continued)

FOREIGN PATENT DOCUMENTS

CN   201867295 U  *  6/2011
CN   112830219 A     5/2021
   (Continued)

*Primary Examiner* — Gordon J Stock, Jr.

(74) *Attorney, Agent, or Firm* — Wood Herron & Evans LLP

(57) ABSTRACT

A light table apparatus and inspection methods are provided for detecting fluid-transmitting defects in heat exchanger plates using light. The method includes positioning the heat exchanger plate on top of a support frame of the apparatus, and covering peripheral portions of the heat exchanger plate with at least one light-shielding element. In some examples, the light-shielding element may be edge mats that cover peripheral portions of the plate, or alternatively, may be a gasket-like template that engages a resilient light seal with profiles of the heat exchanger plate surrounding a central portion thereof. The ambient environment is darkened and illumination units in the support frame are activated, and light energy can only be transmitted through defects in the central portion. Thus, a quick manual inspection process is provided for such plates, and defects as small as 15 microns are accurately detected when using the light table apparatus and inspection methods.

25 Claims, 12 Drawing Sheets

(58) Field of Classification Search
CPC ..... G01N 2021/8864; G01N 2021/888; G01N 2021/8908; G01N 2021/8918; G01N 2021/9516; G01N 2021/95653; F28F 2200/00

See application file for complete search history.

(56) References Cited

U.S. PATENT DOCUMENTS

| | | | |
|---|---|---|---|
| 4,610,157 A * | 9/1986 | Vicki | G01N 21/91 |
| | | | 73/104 |
| 4,724,481 A | 2/1988 | Nishioka | |
| 4,914,309 A | 4/1990 | Masaharu et al. | |
| 5,389,789 A | 2/1995 | Nguyen | |
| 6,958,769 B2 | 10/2005 | Shoenfeld | |
| 8,141,619 B2 * | 3/2012 | Daito | G06T 7/0006 |
| | | | 382/141 |
| 10,788,431 B2 * | 9/2020 | Geis | G01N 21/93 |
| 2019/0003986 A1 | 1/2019 | Bae | |
| 2020/0088652 A1 | 3/2020 | Dunnwald | |

FOREIGN PATENT DOCUMENTS

| | | | | |
|---|---|---|---|---|
| JP | 2006138781 A | * | 6/2006 | |
| JP | 2006162239 A | * | 6/2006 | ........... F28D 1/0391 |
| JP | 2006194865 A | * | 7/2006 | ........... F28D 1/0391 |
| KR | 100573561 B1 | | 4/2006 | |

* cited by examiner

LIGHT TABLE APPARATUS AND METHODS FOR INSPECTING HEAT EXCHANGER PLATES FOR DEFECTS USING LIGHT

TECHNICAL FIELD

This invention relates to defect detection devices and methods for heat exchanger plates, and more specifically, relates to defect detection devices and methods using light transmission to evaluate heat exchanger plates for cracks, pinholes, or the like.

BACKGROUND

Plate heat exchangers are used in many types of technological fields to transfer heat energy into or out of a system. For example, plate heat exchangers are often used for cooling heat energy produced when operating large computer server banks, in one application. In another example, a liquid food product or other consumable may be conditioned with heat energy provided during flow through a plate heat exchanger. It will be readily understood that any fluid-transmitting defects in the heat exchanger plates will cause cross-contamination of the fluids flowing through the heat exchanger (as a result of such fluids typically moving through the heat exchanger at high pressures and flow rates) while also significantly reducing the heat exchange efficiency and capability of the heat exchanger. Moreover, the desired pressures and flow rates of the two fluids moving through the heat exchanger, which may be different from each other, will be adversely affected when fluid-transmitting defects are present in one or more of the heat exchanger plates.

Such fluid-transmitting defects may take the form of pinholes or cracks, and once present, the defects will tend to only get worse with further operation time, undermining the usefulness of the heat exchanger. These defects may generate over time as a result of improper plate installation resulting in friction or impacts of the plates together during operation over time, or a worn sealing gasket between plates, etc. In applications such as the liquid food product example, cross-contamination may cause an entire batch of consumable product to be discarded, while in all cases, operational downtime for the heat exchanger may be critical for the business or operation relying on such cooling or heating. As a result, heat exchangers may be serviced regularly during the lifespan of the heat exchanger to conduct preventative maintenance inspections for any such defects in the heat exchanger plates. Alternatively, whenever a cross-contamination or pressure loss event occurs at an operating heat exchanger, the heat exchanger may be temporarily taken out of service for maintenance inspections to be done to identify any damaged heat exchanger plates and then replace such damaged plates. As with any maintenance and repair service, pressures are demanded by heat exchanger owners to limit the time and cost of such repair services, so as to put the heat exchanger back into operation, but such repair services must also be done accurately or else the heat exchanger will likely quickly fail again, perhaps jeopardizing another batch of product, for example.

For large and small heat exchanger plates with complex profiles and geometries (e.g., including various types of corrugations), there are only a small number of service and repair companies that provide such services in this specific industry. By the understanding of the present inventor, all such companies performing heat exchanger maintenance service are currently reliant on and have long relied on plate inspection by dye penetrant testing, a known type of non-destructive testing for defects and which is performed manually by service technicians in this field. Dye penetrant testing has a couple different varieties but generally works as follows: one side 12 of the central portion of the heat exchanger plate 10 to be inspected is sprayed or coated with the dye penetrant 14, such as shown schematically in FIG. 1A; the dye penetrant 14 is left on the plate 10 for a period of dwell time (which may be up to 24 hours or more, as shown by indicator 16 in FIG. 1B) to allow the penetrant 14 to soak into and/or move through any flaws present on the plate 10, see FIG. 1B; and then an opposite side 18 of the plate 10 is carefully inspected after the dwell time to look for any penetrant incursions to the opposite side, which would therefore indicate the presence of a fluid-transmitting defect at such location on the plate. Such inspection and a couple exemplary instances showing the dye penetrant 14 is shown at detail bubble 20 in FIG. 1C. If any such defects are correctly identified, the plate can be replaced as part of the service to the heat exchanger.

The two primary specific types of dye penetrant testing, to be briefly summarized below, exhibit several limits or disadvantages in this heat exchanger service field. A first type of dye penetrant testing uses a fluorescent dye penetrant that lights up under ultraviolet or "black light" irradiation. The manual inspection step of the opposite side of the heat exchanger plate must take place in a fully-darkened and isolated environment to allow for the ultraviolet lights to reveal the fluorescent dye penetrant, and the sharp contrast of the fluorescent dye penetrant with the darkened environment puts significant visual strain on inspecting workers. Moreover, as dust particles and other contaminants may also illuminate under black light irradiation, each illuminated instance must be separately wiped and checked by the inspecting worker to verify whether an illuminated spot is actually dye penetrant seeping through a fluid-transmitting defect. Particularly with large-size heat exchanger plates, this inspection step is therefore very time consuming for each plate, and also prone to inaccuracies especially as inspecting workers become quickly "burnt out" from the visual strain of such inspections.

A second type of dye penetrant testing uses a colored dye penetrant such as a red dye penetrant along the one side of the heat exchanger plate, in combination with a Talcum-based or similar white developer that is sprayed or coated on the opposite side of the plate. The application of the white developer adds yet another time and labor-consuming step to the inspection process, but such developer is important for being able to see the colored dye penetrant when it seeps through defects to the opposite side of the plate. Although this second type of dye penetrant testing avoids the visual strain of inspecting for fluorescent spots under black light UV illumination, as the red dye penetrant can be seen under regular/visible spectrum light illumination of the white developer, the dwell time for allowing defects to be revealed by dye penetrant incursion onto the developer may be even longer than in the first type of dye penetrant testing. Furthermore, this inspection using colored dye penetrant and white developer is still prone to inaccuracies and long manual inspection times to evaluate any potential darkened spots on the white developer.

As noted above, the inaccuracies present with manual dye penetrant testing are problematic because the entire point of such heat exchanger plate inspection is to identify any plates with fluid-transmitting defects and to replace such plates so that the heat exchanger can remain fully operational again for a long period of time after the inspection/repair service is completed. False positive indications of plate defects occur too frequently still when using dye penetrant testing methods, as false positives can result from any number of things including dye penetrant oversprays, suspended air particles, dust/debris and other transferrable residues, and any improper handling during dye penetrant application. Such testing is also limited in effectiveness of how small of defects can be accurately identified in the plates, as evidenced by the penetrant testing equipment commercially available for evaluating dye penetrant inspection performance, such as described at U.S. Patent Publication No. 2020/0088652 to Dunnwald (in which the smallest sample defect used is about 50 microns/micrometers in cross-dimension). Furthermore, the dye penetrant testing methods require one or more spraying steps and then cleaning off steps to remove the dye penetrant and/or the developer from the heat exchanger plates after the inspection is completed, these spraying and cleaning steps adding significant further materials cost and labor cost to the inspection process for each individual plate. These deficiencies are present in all types of dye penetrant inspections.

With heat exchanger service companies trying to accurately process these inspections quickly for multiple different clients in order to minimize operational downtime for the associated heat exchangers of the clients, the significant time and labor costs and the limits of accuracy exhibited by dye penetrant inspections are generally undesirable in this field. Nevertheless, dye penetrant inspections continue to be widely used as the best-available inspection process for heat exchanger and plate maintenance and repair. Other known types of sheet material inspection, such as automated camera-based inspection, have not been adopted in this field for various reasons, including even further increased inspection system costs and complexity (for insignificant, if present at all, gains in accuracy over manual dye penetrant inspections), as well as an inflexibility of such inspection automated equipment installations that do not permit such inspections to occur on site at a heat exchanger owner/operator, which is demanded in many circumstances of service companies.

It would therefore be desirable to improve accuracy and efficiency of the inspection process for identifying fluid-transmitting defects in heat exchanger plates, especially such inspection processes that can be performed manually as compared with present dye penetrant inspection methods.

SUMMARY

In order to address these and other deficiencies in the heat exchanger plate inspection field, an inspection method is provided for detecting fluid-transmitting defects in a heat exchanger plate, in a first set of embodiments of the present invention. This method includes manually positioning a heat exchanger plate on top of a support frame of a light table apparatus. The support frame contains a plurality of illumination units configured to produce light energy. The method also includes covering peripheral portions of the heat exchanger plate with at least one light-shielding element. The peripheral portions surround a central portion of the heat exchanger plate that is to be inspected, and the light-shielding element is configured to block light energy transmission around or through the peripheral portions of the heat exchanger plate. The method further includes darkening an ambient environment around the light table apparatus and operating one or more of the plurality of illumination units to produce light energy and thereby irradiate one side of the central portion of the heat exchanger plate that faces towards the top of the support frame. Then, an opposite side of the central portion of the heat exchanger plate is manually visually inspected while the ambient environment is darkened and the plurality of illumination units are operated. Light energy from the illumination units will escape through the central portion of the heat exchanger plate only through fluid-transmitting defects present in the central portion. To this end, such defects are illuminated in a manner detectable by eyes of a user performing the manual visual inspection step, which allows the user to accurately identify and locate any such defects in the heat exchanger plate. The inspection method is advantageously easier and quicker for service personnel to complete manually, while removing significant labor time and materials cost associated with conventional dye penetrant testing. More importantly, the inspection method using light accurately identifies fluid-transmitting defects of a much smaller size than the dye penetrant testing, with significantly increased accuracy overall to remove the likelihood for any "false positive" tests that lead to unnecessary heat exchanger plate replacements.

In one embodiment, the light-shielding element includes a gasket-like template with a light-transmissive base panel and a resilient light seal coupled to the base panel. The step of covering peripheral portions of the heat exchanger plate with the light-shielding element further includes manually positioning the gasket-like template on top of the support frame of the light table apparatus, with the resilient light seal facing upwardly away from the support frame, before the step of manually positioning the heat exchanger plate. The resilient light seal is engaged with contours defined along the peripheral portions of the heat exchanger plate as the heat exchanger plate is positioned on top of the support frame, such that the central portion and corrugations located on the central portion are circumferentially surrounded along the one side of the heat exchanger plate that faces towards the gasket-like template and towards the support frame. Portions of the base panel located circumferentially outwardly from the resilient light seal are painted or coated with a light-blocking material to further assist with blocking of light energy transmission around or through the peripheral portions of the heat exchanger plate.

In another embodiment, the heat exchanger plate includes apertures at the peripheral portions configured to serve as fluid inlets and outlets during use in a heat exchanger. The step of covering peripheral portions of the heat exchanger plate with the light-shielding element then includes inserting circular blocking gaskets into the apertures of the heat exchanger plate to further block light transmission through the apertures and through the peripheral portions of the plate. Moreover, the heat exchanger plate can further include a corrugated contour extending between the apertures and the central portion. In such embodiments, the step of engaging the resilient light seal with the heat exchanger plate further includes engaging divided portions of the resilient light seal with the corrugated contour to block light transmission between the central portion and the apertures of the heat exchanger plate.

In a further embodiment, the light-shielding element includes a plurality of edge mats formed from a non-light-transmissive material. The step of covering peripheral portions of the heat exchanger plate with the light-shielding element then includes manually positioning the plurality of edge mats to overlap at least peripheral edges of the heat exchanger plate along the peripheral portions thereof. The edge mats are positioned to prevent light energy from transmitting through or around the peripheral edges and peripheral portions of the heat exchanger plate. In such embodiments, the circular blocking gaskets described above may also be inserted into apertures in the peripheral portions of the heat exchanger plates, and it will be understood that the edge mats may be positioned spaced apart from or overlapping the circular blocking gaskets. In further combinations, the edge mats may be used in conjunction with the gasket-like template in further embodiments, depending on the particular light blocking needs and preferences of the inspection personnel, although such combinations are not necessarily required to sufficiently focus light transmission only through any defects in the central portion of the heat exchanger plates.

In yet another embodiment, the light table apparatus includes wheels and legs connected to and extending downwardly from the support frame towards the wheels. The method also includes rolling the light table apparatus using the wheels into position in an environment that can be darkened for testing heat exchanger plates for the defects.

In one embodiment, the light table apparatus also includes a control mechanism with a plurality of switches operatively connected to individual units of the plurality of illumination units. The step of operating the illumination units to produce light energy further includes activating, using the switches, a partial portion of the illumination units to vary a size of an area of illumination on top of the support frame that is irradiated with light energy. This tailors the size of the area of illumination to a size of the heat exchanger plate to be inspected. It will be further understood that the support frame is configured to reflect light so that all light energy from the illumination units is delivered directly or indirectly to the top of the support panel and towards the heat exchanger plate. When all of the plurality of illumination units are activated, at least 100,000 lumens of light energy are generated at the light table apparatus. This arrangement results in lighting up any fluid-transmitting defects just as much if not more so than fluorescent dye penetrant does in that conventional type of testing, but without all the many downsides of using dye penetrant including avoidance of false positives made by non-defects.

In a further embodiment, the step of manually visually inspecting the heat exchanger plate includes successfully identifying and locating any pinholes, cracks, or other fluid-transmitting defects having a cross-dimension as small as 15 microns or more, as a result of illumination of such defects caused by light passage through the defects.

In another embodiment, the method does not include any step of spraying or coating the heat exchanger plate with a dye penetrant or other coating before manually visually inspecting the heat exchanger plate, which also results in no step of washing the dye penetrant or other coating off the plate. Likewise, the method also does not include any automated image capture or image processing to determine where fluid-transmitting defects are located on the heat exchanger plate.

In a second set of embodiments according to the invention, an inspection method is provided for detecting fluid-transmitting defects in a heat exchanger plate. The method includes positioning a heat exchanger plate on top of a support frame of a light table apparatus. The support frame contains a plurality of illumination units configured to produce light energy, and the heat exchanger plate includes peripheral portions surrounding a central portion. The method includes positioning a gasket-like template on top of the support frame of the light table apparatus before the step of manually positioning the heat exchanger plate. The gasket-like template has a light-transmissive base panel and a resilient light seal coupled to the base panel and facing upwardly away from the support frame. The gasket-like template is configured to block light energy transmission around or through the peripheral portions of the heat exchanger plate. The method further includes engaging the resilient light seal with contours defined along the peripheral portions of the heat exchanger plate as the plate is positioned on top of the support frame, such that the central portions and corrugations located on the central portion are circumferentially surrounded along one side of the plate that faces towards the gasket-like template and towards the support frame. The method then includes darkening an ambient environment around the light table apparatus and operating one or more of the illumination units to produce light energy and thereby irradiate the one side of the central portion of the heat exchanger plate that faces towards the top of the support frame. While the ambient environment is darkened and the illumination units are operated, an opposite side of the central portion of the heat exchanger plate is visually inspected. Light energy from the illumination units escapes through the central portion of the heat exchanger only through fluid-transmitting defects such that those defects are illuminated in a manner that enables accurate identification and location of the defects in the heat exchanger plate. As with the above embodiments, the inspection method is advantageously easier and quicker for service personnel to complete, while removing significant labor time and materials cost associated with conventional dye penetrant testing, and with significantly increased accuracy and higher precision (smaller defects detected).

In one embodiment, portions of the base panel of the gasket-like template located circumferentially outwardly from the resilient light seal are pained or coated with a light-blocking material to assist with blocking of light energy transmission.

In another embodiment, the heat exchanger plate includes apertures at the peripheral portions that serve as fluid inlets and outlets during use in a heat exchanger. The method would then include inserting circular blocking gaskets into the apertures of the heat exchanger plate to further block light transmission through the apertures and through the peripheral portions of the heat exchanger plate. In versions where the heat exchanger plate includes a corrugated contour extending between the apertures and the central portion, the step of engaging the resilient light seal with the heat exchanger plate further includes engaging divided portions of the resilient light seal with the corrugated contour to block light transmission between the central portion and the apertures of the heat exchanger plate.

In yet another embodiment, the light table apparatus includes a control mechanism with a plurality of switches operatively connected to individual ones of the illumination units. The step of operating the illumination units to produce light energy can further include activating, using the switches, a partial portion of the illumination units to vary a size of an area of illumination of the top of the support frame that is irradiated with light energy, to thereby tailor the size of the area of illumination to a size of the heat exchanger plate to be inspected for defects.

As with previous embodiments, the step of visually inspecting the heat exchanger plate includes successfully identifying and locating any pinholes, cracks, or other fluid-transmitting defects having a cross-dimension as small as 15 microns or more, as a result of illumination of such defects caused by light passage through the defects. The inspection method achieves this higher precision and accuracy with less labor and materials use, thereby improving all aspects of inspection and maintenance services for heat exchangers and their plates.

In a third set of embodiments according to the present invention, a light table apparatus is provided for detection of fluid-transmitting defects in a heat exchanger plate. The light table apparatus includes a support frame defining an enclosed space, with a plurality of illumination units enclosed within the enclosed space. The support frame has a bottom wall and sidewalls defined by a non-light-transmissive material and a top wall defined by a light-transmissive panel, with the top wall being sized to receive an entirety of one or more heat exchanger plates laid manually by a user onto the light-transmissive panel so as to be tested for defects. The light table apparatus further includes a control mechanism for selectively operating one or more of the plurality of illumination units to thereby irradiate light energy through the light-transmissive panel at the top wall. At least one light-shielding element is positioned in engagement with the heat exchanger plate by the user when the heat exchanger plate is positioned onto the light-transmissive panel. The light-shielding element is configured to block light energy transmission around or through peripheral portions of the heat exchanger plate such that light energy irradiated from the illumination units is directed to one side of a central portion of the plate, which faces towards the support frame and is surrounded circumferentially by the peripheral portions of the plate. When the heat exchanger plate and light shielding element are positioned, and the illumination units are activated to produce light energy, an environment surrounding the light table apparatus can be darkened and then light energy will escape only through defects in the central portion of the heat exchanger plate. As a result, a user visually inspecting an opposite side of the central portion of the heat exchanger plate, e.g., the one facing away from the support frame, will be able to identify and locate any defects revealed by such transmission of light energy through the defects.

The light table apparatus is advantageously easier and quicker for service personnel to use, while removing significant labor time and materials cost associated with conventional dye penetrant testing. More importantly, inspection using the light table apparatus accurately identifies fluid-transmitting defects of a much smaller size than the dye penetrant testing, with significantly increased accuracy overall to remove the likelihood for any "false positive" tests that lead to unnecessary heat exchanger plate replacements.

In one embodiment, the heat exchanger plate includes corrugations along the central portion. The light shielding element then further includes a gasket-like template with a light-transmissive base panel that is generally concurrent in size with the heat exchanger plate to be inspected. The gasket-like template also includes a resilient light seal coupled to the base panel and shaped to engage with contours defined along the peripheral portions of the heat exchanger plate to thereby surround circumferentially the central portion and its corrugations along the one side of the plate that faces towards the gasket-like template. Portions of the base panel located circumferentially outwardly from the resilient light seal are painted or coated with a light-blocking material to further assist with blocking of light energy transmission around or through the peripheral portions of the heat exchanger plate.

In another embodiment, the base panel of the gasket-like template is formed from plexiglass material, and the resilient light seal is formed from rubber material. The light-blocking material may be defined by a black paint or another solid black material adhered to the base panel at the appropriate locations.

In a further embodiment, the heat exchanger plate includes apertures at the peripheral portions that serve as fluid inlets and outlets during use in a heat exchanger. In such embodiments, the light shielding element further includes circular blocking gaskets sized to be inserted into the apertures of the heat exchanger plate to block light transmission through the apertures and through the peripheral portions of the heat exchanger plate. In some further embodiments, the heat exchanger plate may also include a corrugated contour positioned between these apertures and the central portion, and then the resilient light seal further includes divided portions engaging with the corrugated contour to block light transmission between the central portion and the apertures.

In yet another embodiment, the light shielding element also includes a plurality of edge mats positioned to overlap at least peripheral edges of the heat exchanger plate along the peripheral portions. Each of the edge mats is formed from a non-light-transmissive material so as to block light transmission around the peripheral portions and the peripheral edges of the heat exchanger plate. When the light shielding element includes the circular blocking gaskets for the apertures as noted above, the plurality of edge mays may be positioned spaced apart from or overlapping with the circular blocking gaskets, thereby working together to block light transmission through the peripheral portions of the heat exchanger plate.

In one embodiment, the support frame is connected to legs extending downwardly from the bottom wall and to a set of wheels. The wheels enable the light table apparatus to be moved to a location that can be selectively darkened for conducting inspections of the plate.

In another embodiment, the control mechanism includes a plurality of switches mounted on the support frame and connected to individual ones of the illumination units. The switches are configured to allow users to selectively illuminate all or a partial portion of the illumination units to vary an area of the light-transmissive panel at the top wall that receives light energy for testing various sizes of heat exchanger plates that may be placed on the top wall.

In yet another embodiment, the support frame is formed from wood material to define the non-light-transmissive material, and formed from plexiglass material as the light-transmissive panel. The plurality of illumination units are collectively configured to output at least 100,000 lumens of light energy when activated.

As with previous embodiments, the light table apparatus is configured to allow for identifying and locating any pinholes, cracks, or other fluid-transmitting defects having a cross-dimension as small as 15 microns or more, as a result of illumination of such defects caused by light passage through the defects. The light table apparatus achieves this higher precision and accuracy of defect testing with less labor and materials use, thereby improving all aspects of inspection and maintenance services for heat exchangers and their plates.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

FIGS. 2 through 10 illustrate various embodiments of a light table apparatus 30 that may be used to perform inspection methods for detecting fluid-transmitting defects in a heat exchanger plate 32, in accordance with aspects of the present invention. By focusing light energy irradiation on one side of the heat exchanger plate 32 and blocking unwanted light energy escape around peripheral portions and edges of the plate 32, such as with one or more light shielding elements to be described further below, any fluid-transmitting defects will visibly light up as the only path for light energy to escape to the opposite side of the plate 32. For example, one such light shielding element may be a gasket-like template 34 (see FIG. 7) that is closely configured in size to the heat exchanger plate 32 to be inspected, the gasket-like template 34 sealing against the heat exchanger plate 32 to block unwanted light escape except at an area of the plate 32 to be inspected. When the light table apparatus 30 is put in a darkened environment during the irradiation with light energy from the light table apparatus 30, the defects can therefore easily and accurately be identified and located on the heat exchanger plate 32. Advantageously, such inspection can be done manually by users much more quickly than conventional dye penetrant inspections, as a result of eliminating the need for spraying and cleaning the plate 32 as well as the dwell time. Moreover, the inspections done with the light table apparatus 30 of this invention are more accurate and reliable at detecting all defects having a cross-dimensional size of 15 microns or more, which is much more precise than conventional dye penetrant inspections, while also eliminating false positives that lead to unnecessary plate replacements when conducting maintenance and repair of heat exchangers.

Figure 1A:
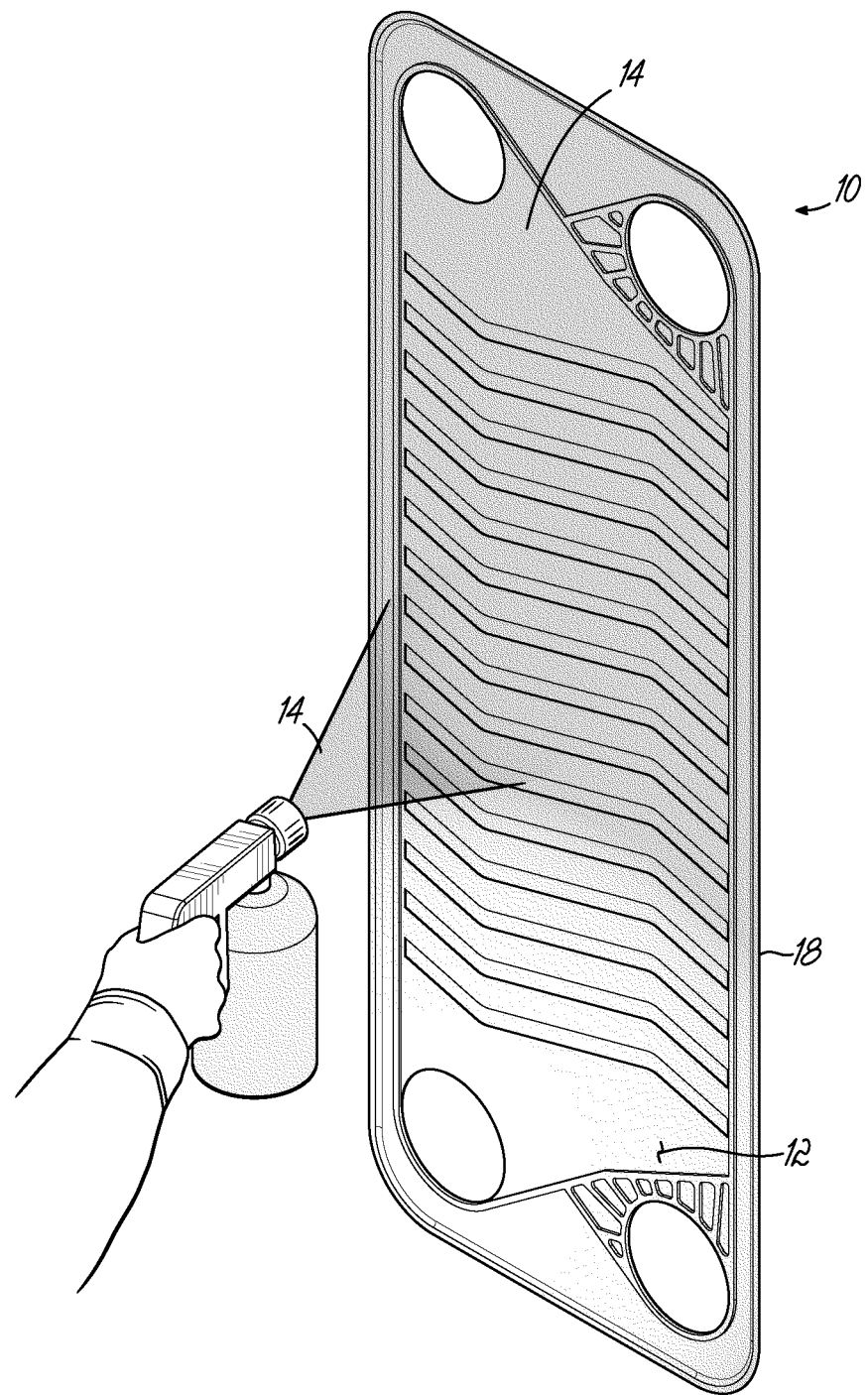
FIG. 1A is a perspective view of a first step of a conventional dye penetrant process for defect inspection of a heat exchanger plate, in which a user sprays one side of the heat exchanger plate with a dye penetrant.
Figure 1B:
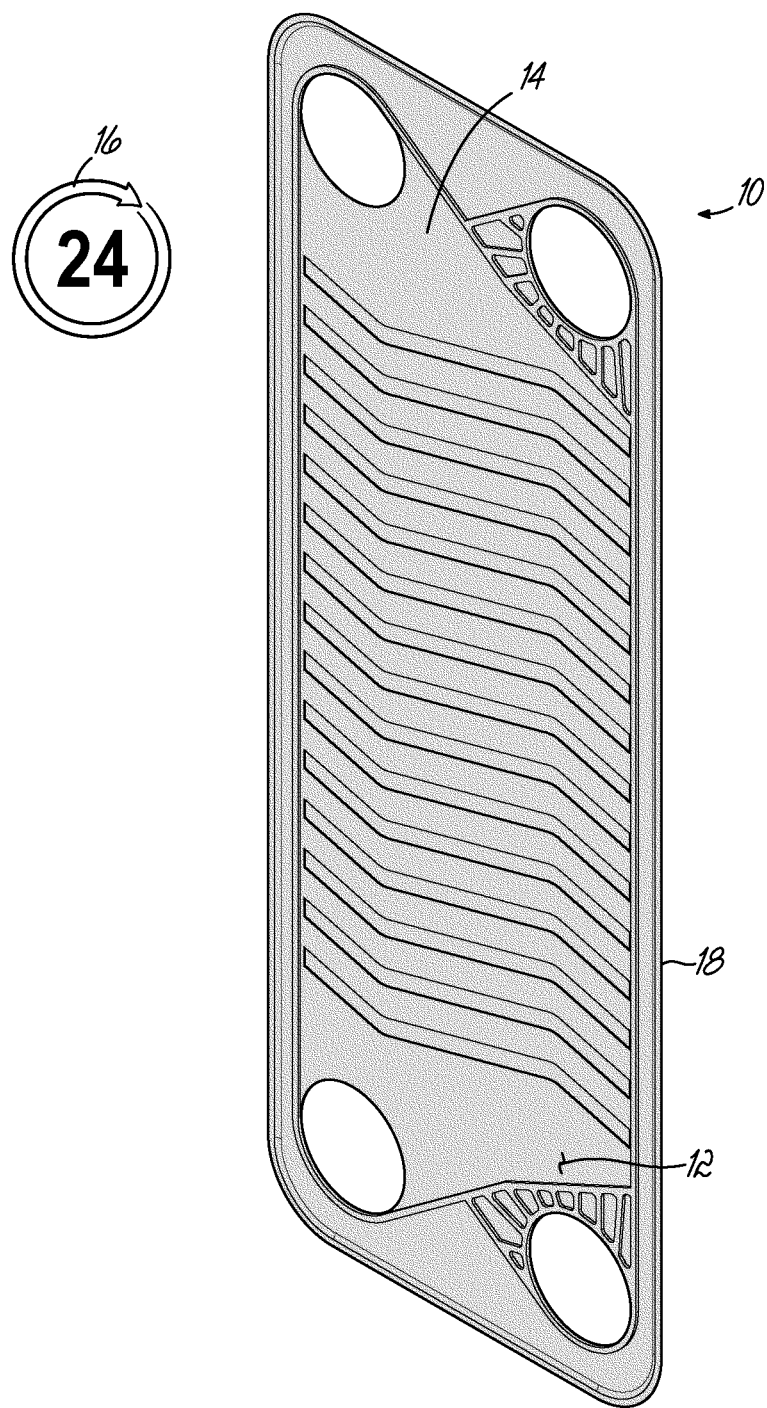
FIG. 1B is a perspective view of a second step of the conventional dye penetrant process of FIG. 1A, in which the dye penetrant sits on the heat exchanger plate for a number of hours to allow for seepage into and through any defects present.
Figure 1C:
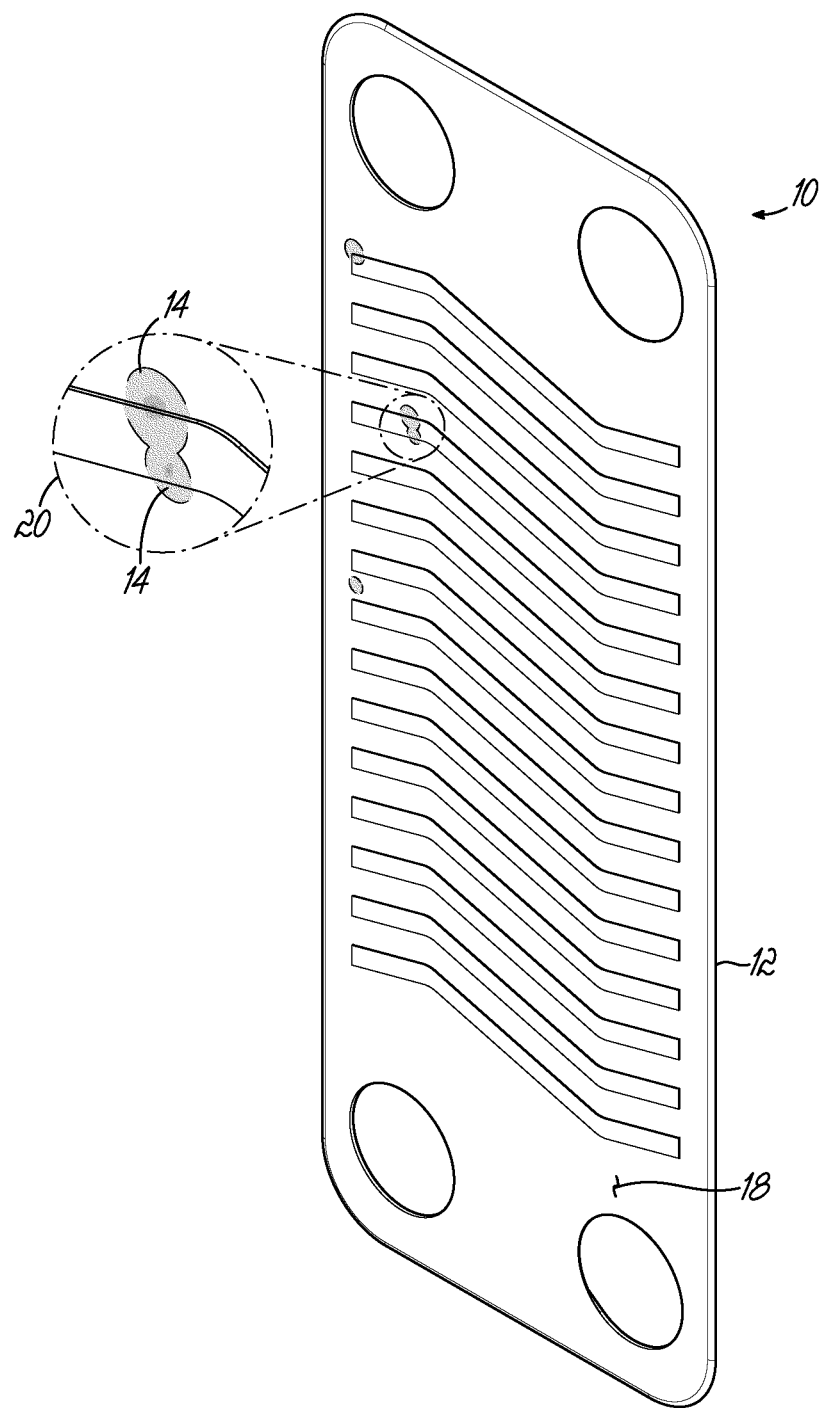
FIG. 1C is a perspective view of a third step of the conventional dye penetrant process of FIG. 1B, in which an opposite side of the heat exchanger plate has been sprayed with a white developer such that any seepage of the dye penetrant can be detected visually by the user to identify potential defects in the heat exchanger plate.
Figure 2:
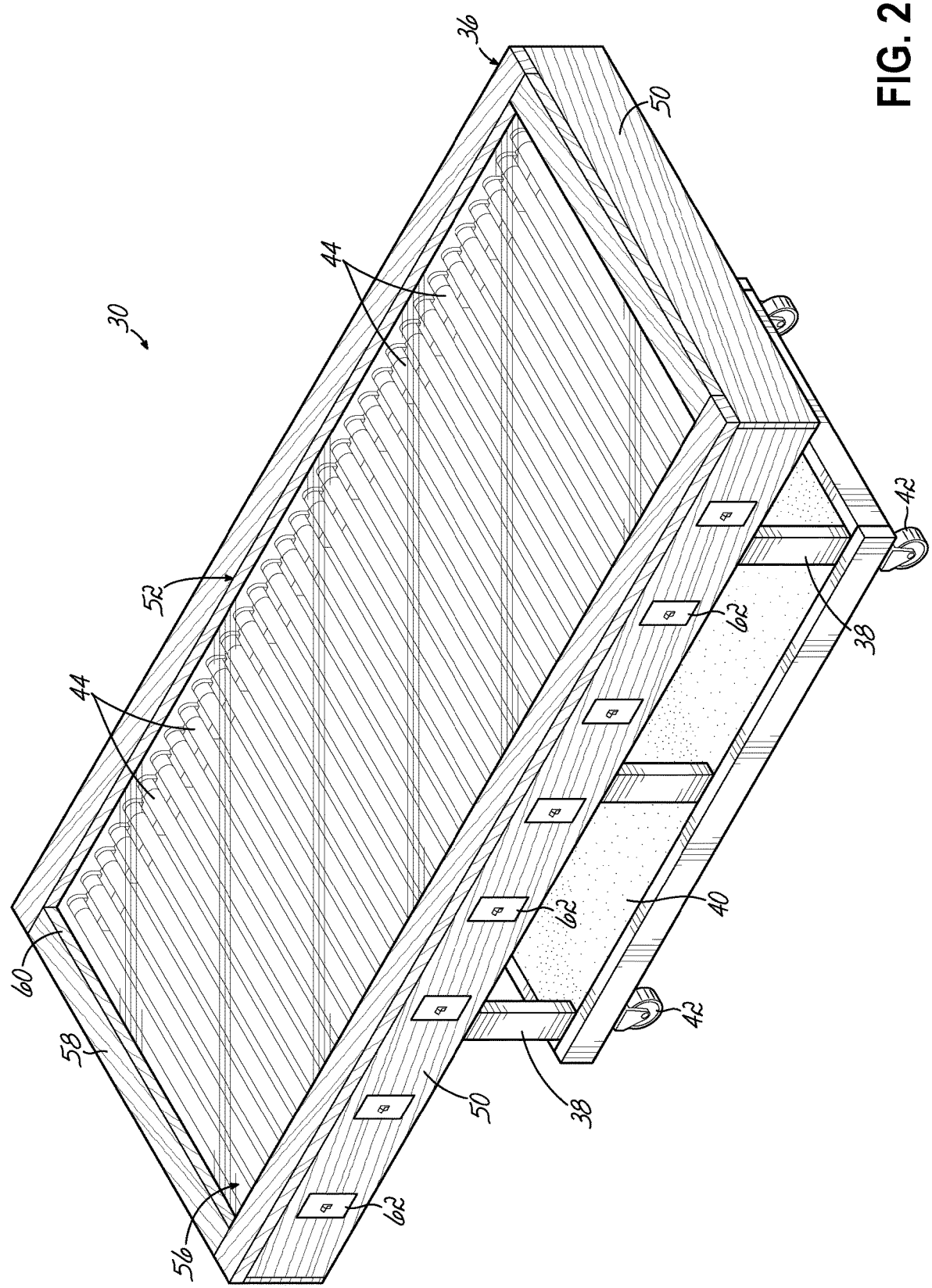
FIG. 2 is a top perspective view of a light table used for detection of defects in heat exchanger plates using light energy, in accordance with one embodiment of the invention.
Figure 3:
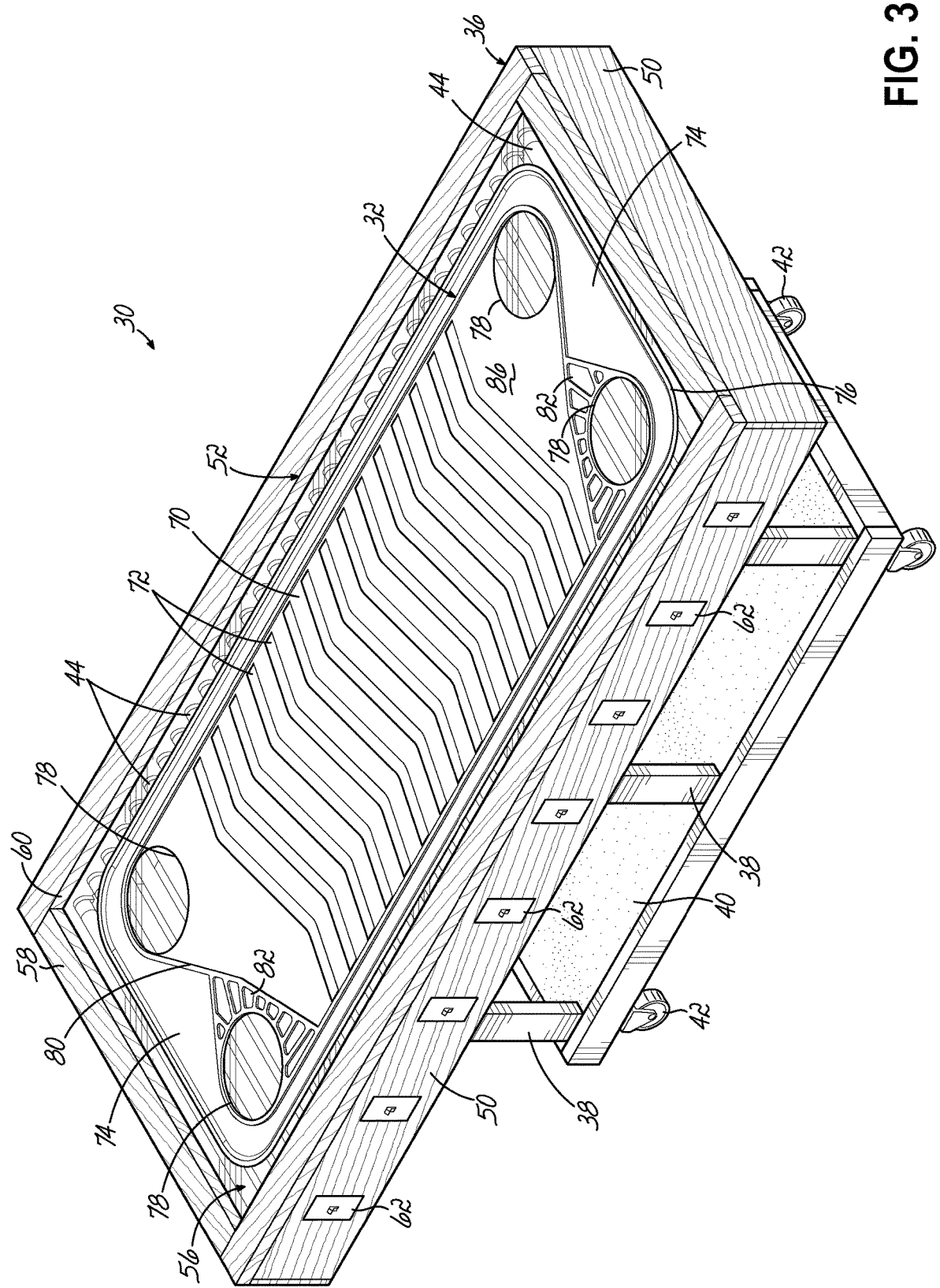
FIG. 3 is a top perspective view of the light table of FIG. 2, with a heat exchanger plate placed on top of the light table at the beginning of a manual inspection process.
Figure 4:
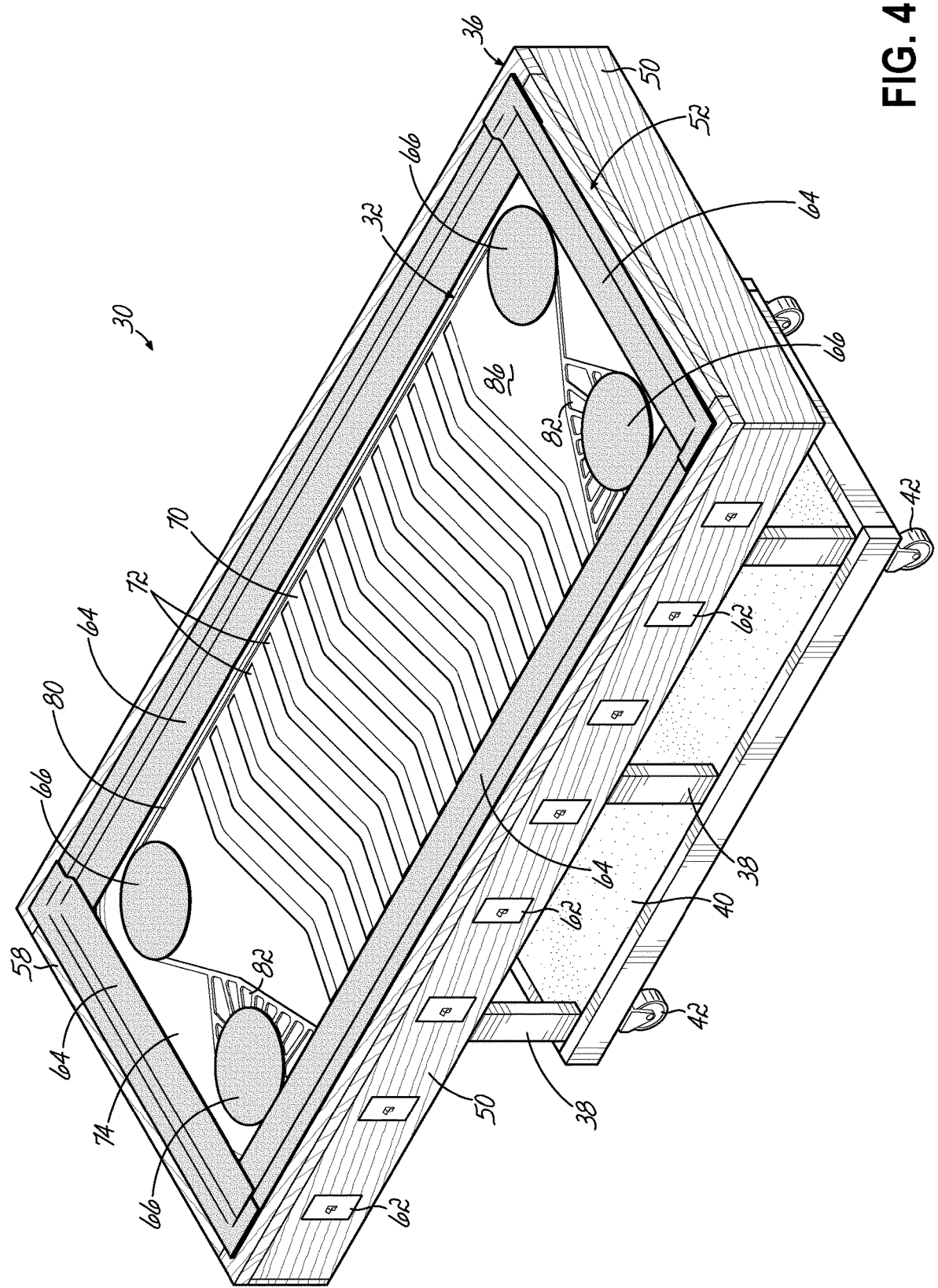
FIG. 4 is a top perspective view of the light table of FIG. 3, with light blocking shields positioned at portions of the heat exchanger plate to force light energy from the light table to emit only through defects present in a central portion of the plate.

Now turning with particular reference to FIGS. 2 through 4, a first embodiment of the light table apparatus 30 is shown. Some features of this and other embodiments of the light table apparatus 30 are more clearly shown in the cross-sectional view at FIG. 8 as well. The light table apparatus 30 generally includes a support frame 36 located at the top thereof, a plurality of legs 38 extending downwardly from the support frame 36 to a base 40, which carries a set of wheels 42. The support frame 36 is the principal operating portion of the light table apparatus 30 and it houses a plurality of illumination units 44 as can be seen in FIG. 2. The illumination units 44 are shown as tube-shaped fluorescent bulbs in the drawing views, but it will be understood that any type of activatable lights (LED, etc.) may be positioned within the support frame 36 for conducting the inspection methods described herein. The wheels 42 are mounted to the base 40 in these illustrations, but it will be understood that the wheels 42 could instead be mounted directly on the bottom of the legs 38 in other embodiments. Moreover, the base 40 can be omitted in such embodiments, and the wheels 42 may also be omitted when it is not necessary to move the light table apparatus to different sites for conducting heat exchanger plate inspections. However, when the set of wheels 42 is provided, the light table apparatus 30 can be selectively moved to on-site locations where plate inspections and maintenance are to be done, such as on site where the heat exchanger is installed, so long as the surrounding ambient environment can be darkened when the inspection with light energy is to occur.

The support frame 36 of the light table apparatus 30 is now described in further detail. The support frame 36 includes a bottom wall 48 and sidewalls 50 defined by a non-light-transmissive material, the bottom wall 48 being connected to the sidewalls 50 by fasteners, adhesives, or the like. In one particular example, the bottom wall 48 may be defined by a sheet of plywood while the four sidewalls 50, which collectively define a rectangular shape for the support frame 36, are also formed from wood material (can be 2×4 or sheet materials). As most clearly visible in FIG. 8, the sidewalls 50 of the illustrated embodiment project both above and below the junction with the bottom wall 48, although it will be understood that other embodiments may not have the sidewalls 50 project below the bottom wall 48.

At the top end of the sidewalls 50, the support frame 36 further includes a top wall 52 that connects to the sidewalls 50 to close off an enclosed space 54 (for containing the illumination units 44) within the support frame 36. The top wall 52 includes a light-transmissive panel 56 that may be formed from Plexiglass, in one example. The top wall 52 of this embodiment also includes a peripheral edge frame 58 that connects to the light-transmissive panel 56 as well as the sidewalls 50 (this may also be considered in some embodiments to be a part of the sidewalls 50 that overlies the periphery of the Plexiglass panel). The peripheral edge frame 58 is also formed from wood material in this embodiment, and it helps close off the peripheral edges of the light-transmissive panel 56 such that any light energy emitted within the enclosed space 54 can only escape upwardly through the remainder of the top wall 52 at the light-transmissive panel 56. Because the peripheral edge frame 58 of the top wall 52 extends above the top of the sidewalls 50 and the light-transmissive panel 56, a receiving space 60 is therefore provided in the top wall 52 above the top of the light-transmissive panel 56, this receiving space 60 being sized to receive an entirety of one or more heat exchanger plates 32 to be inspected.

The exterior of the support frame 36 along some or all of the bottom wall 48, the sidewalls 50, and the peripheral edge frame 58 may be painted to help assure any connections therebetween are sealed from letting light energy in the enclosed space 54 escape at the connections. As a result of the support frame 36 being manufactured from non-light-transmissive materials except along the top wall 52, all light energy emitted from the illumination units 44 can be focused for delivery upwardly only through the light-transmissive panel 56. To this end, any reflected or incident rays of light from the illumination units 44 will eventually move through the light-transmissive panel 56, thereby maximizing the light energy output from the illumination units 44 towards the heat exchanger plate 32, once the latter is placed on top of the top wall 52. It will be understood that the particular materials and shape of the support frame 36 may be modified in other embodiments, so long as the support frame 36 still encloses the illumination units 44 and still focuses light irradiation towards the heat exchanger plate 32.

Also visible in FIGS. 2 through 4, the light table apparatus 30 includes a control mechanism defined by a plurality of light switches 62 installed along one or more of the sidewalls 50 on the support frame 36. The light switches 62 are operatively coupled to individual ones of the illumination units 44 and thereby control each illumination unit 44 to allow for selective illumination of a partial portion or all of the area defined by the light table apparatus 30. One of the light switches 62 may be configured as a "master switch" that controls power supply to all illumination units 44, with the remaining light switches 62 controlling whether an individual illumination unit 44 receives this electrical powering. The light switches 62 and the illumination units 44 are wired to a power supply such as by a power plug that can connect to a wall or floor outlet proximate to the light table apparatus 30. Alternatively, a portable power supply such as a battery pack may be carried by the light table apparatus 30 in other embodiments without departing from the scope of the invention. It will further be appreciated that one of the sidewalls 50 of the support frame 36 may be removably connected to the remainder of the support frame 36 to allow for servicing (replacement of bulbs for illumination units 44, wiring fixes, etc.) if that becomes necessary. Furthermore, the control mechanism may be reconfigured in other embodiments such as by including more or fewer light switches, depending on the preferences of the end user/plate inspector.

As a result of the construction of the support frame 36 and the number of illumination units 44 used, the light table apparatus 30 is configured to output at least 100,000 lumens of light energy when the control mechanism activates all of the illumination units 44. With all of this light energy being directed through the light-transmissive panel 56 of the top wall 52 and towards the receiving space 60, any fluid-transmitting defects in a heat exchanger plate 32 within the receiving space 60 will light up with significant illumination. This advantageous operation becomes more apparent in view of the additional elements of the light table apparatus 30 now described below.

With continued reference to FIGS. 2 through 4, additional elements of the light table apparatus 30 and some steps of an inspection method using the light table apparatus 30 are shown in detail. In this regard, FIG. 2 illustrates the light table apparatus 30 as it appears before use, with the receiving space 60 open at the top of the support frame 36 so that all of the illumination units 44 are visible through the light-transmissive panel 56. Then in FIG. 3, a large-sized heat exchanger plate 32 is laid onto the light transmissive panel 56 and into the receiving space 60. Finally, in FIG. 4, at least one light shielding element is engaged with the support frame 36 and the heat exchanger plate 32 to block unwanted light energy transmission except through a portion of the heat exchanger plate 32 to be inspected for the defects. The light shielding element may include one or more elements in combination to achieve this light blocking function. In the embodiment at FIGS. 3 and 4, the light shielding element specifically includes a plurality of edge mats 64 and circular blocking gaskets 66 laid generally on top of portions of the heat exchanger plate 32.

As shown in FIG. 3, an exemplary heat exchanger plate 32 typically includes a central portion 70 having a plurality of corrugations 72, this central portion 70 being the area along which fluid flows when the heat exchanger is assembled to exchange heat energy with fluids on an opposite side of the central portion 70 of this plate 32. The central portion 70 is surrounded by peripheral portions 74 of the heat exchanger plate 32 which define the peripheral edges 76 of the plate 32. Large apertures 78 are also located along the peripheral portions 74 to serve as primary fluid inlets and outlets for flow through the heat exchanger when the plate 32 is assembled with other plates within the heat exchanger. The peripheral portions 74 will typically include a sealing groove 80 or path that circumferentially surrounds both the central portion 70 and two of the apertures 78, and this is where a sealing gasket would engage with the heat exchanger plate 32 in the full heat exchanger assembly to allow for fluid flow across the surface of the heat exchanger plate 32 from inlet to outlet. Other areas of the heat exchanger plate 32 along the peripheral portions 74 may include corrugated contours 82 as well, for strength or material savings or other functions desired during operation within the heat exchanger. One such corrugated contour 82 is located between the central portion 70 and the other apertures 78, e.g., those not surrounded by the sealing gasket groove 80 for active use on this side of the heat exchanger plate 32. However, it will be understood that the various corrugations and plate profiles will vary in each heat exchanger design and the schematic illustrations of these plate features is provided solely for the sake of better understanding the operation of components of the light table apparatus 30.

Returning to FIG. 4, the circular blocking gaskets 66 are shown in position either inserted into the apertures 78 of the heat exchanger plate 32 or directly overlaying such apertures 78 to cover these larger-sized openings through the plate 32. The plurality of edge mats 64 are then laid over the peripheral portions 74 of the heat exchanger plate 32, at least such that the edge mats 64 cover all the peripheral edges 76 of the plate 32. The edge mats 64 and the circular blocking gaskets 66 are formed from a non-light-transmissive material such as black vinyl or rubber, so as to effectively block light energy emitting upwardly through the top wall 52 from escaping through the peripheral portions 74 of the plate 32, including specifically through the apertures 78 or around the peripheral edges 76. This is also made evident by the fact that the illumination units 44 can still be seen from above the light table apparatus 30 in some places in FIG. 3, but no portion of the illumination units 44 remains visible from above the light table apparatus 30 after placement of the light shielding element(s) as shown in FIG. 4. Each of the circular blocking gaskets 66 and the edge mats 64 may be manually positioned by a user after the heat exchanger plate 32 is positioned on the support frame 36 as shown previously in FIG. 3, and it will be understood that the edge mats 64 may be placed spaced apart from, partially overlapping, or fully overlapping the circular blocking gaskets 66. The only requirement beyond having these elements of the light shielding element covering peripheral portions 74 of the heat exchanger plate 32 is to leave the central portion 70 generally uncovered so that light illumination through any fluid-transmitting defects can be detected visually by a user during an inspection process. The particular size and positioning of the edge mats 64 can easily be varied by a user to work with different shapes and sizes of heat exchanger plate 32 that is located on the light table apparatus 30 for inspection.

Once the user has positioned the heat exchanger plate 32 and the light shielding elements as shown in FIG. 4, the control mechanism at the light switches 62 can be used to activate light energy emission from the illumination units 44. To enhance visibility of any light escape through any defects present in the heat exchanger plate 32, the user also should darken the ambient environment around the light table apparatus 30, such as by shutting off ambient light sources to darken a room where the light table apparatus 30 is placed. As described above, 100,000 lumens of light energy are irradiated along the one side 84 of the heat exchanger plate 32 that faces towards the support frame 36, and the support frame 36 and the light shielding elements (64, 66 in this embodiment) prevent any of this light energy from escaping except through fluid-transmitting defects in the central portion 70 of the plate 32. Consequently, a user that is manually visually inspecting the opposite side 86 of the heat exchanger plate 32, which faces away from the support frame 36, will be able to readily identify and locate any defects that are revealed by the light energy transmission/escape through the defects.

Figure 5:
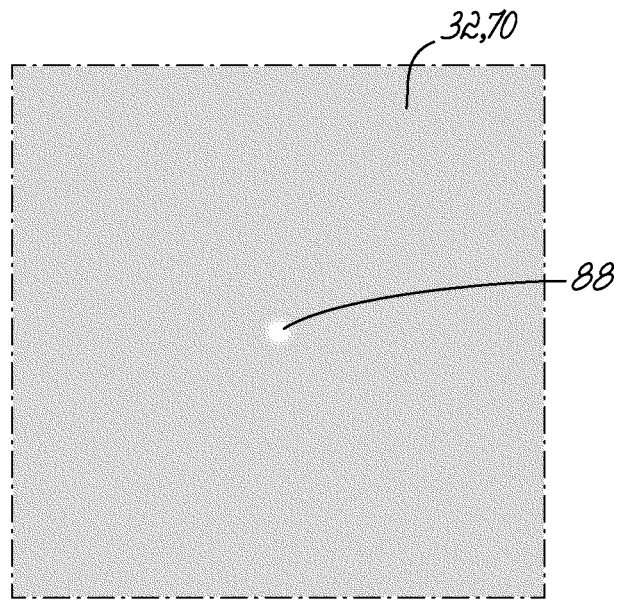
FIG. 5 is a top plan view of the visual appearance of a pinhole defect in the heat exchanger plate when testing for such defects using the light table of FIG. 2.
Figure 6:
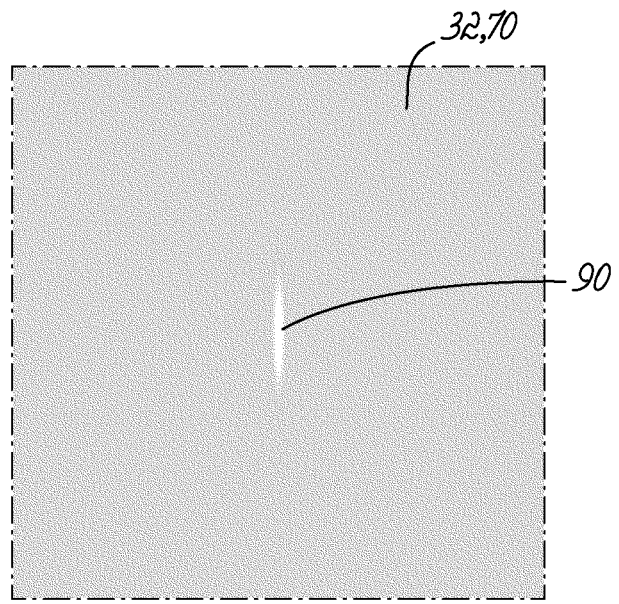
FIG. 6 is a top plan view of the visual appearance of an elongated crack defect in the heat exchanger plate when testing for such defects using the light table of FIG. 2.

Two such examples of what this light escape or transmission may look like in operation are shown at FIGS. 5 and 6. FIG. 5 specifically shows a pinhole-shaped defect 88 that is lit up by the light energy escaping therethrough, while the surrounding area of the central portion 70 of the plate 32 is dark because the solid metallic material of the plate 32 is blocking all light energy along other portions of the plate 32. FIG. 6 specifically shows a crack-shaped defect 90 clearly illuminated as compared to the black/dark surroundings of the solid metallic material of the plate 32. Advantageously, any fluid-transmitting defects of these or other types having a cross-dimension as small as 15 microns or more will transmit sufficient light energy to be clearly visible (in the darkened environment) to a user that is visually inspecting with their eyes the heat exchanger plate 32 on the light table apparatus 30. Thus, automated image capture and processing equipment is not needed to provide highly precise and accurate detection of fluid-transmitting defects in heat exchanger plates 32. The size of defect visible and reliably detectable in manual inspections with the light table apparatus 30 of this invention is thus much smaller than dye penetrant inspection methods, meaning more defects can be properly diagnosed and corrected by heat exchanger plate replacement. Furthermore, as the illumination can only come from transmission of the visible spectrum light and not from dust or the like (as is the case when using UV black light inspection for dye penetrant inspection methods), false positive indications of defects are avoided while also being easier on the eyes of the inspecting user.

The light table apparatus 30 of this first described embodiment thus allows for a quick and easy manual inspection of heat exchanger plates 32 for any fluid-transmitting defects that would undermine the operation of a heat exchanger using such plates 32. As evident from the description above, any size and shape of heat exchanger plate 32 can be positioned on top of the support frame 36 and covered at peripheral portions 74 with the light shielding element(s) to allow for illumination of only defects, if present, within the plate 32. The inspection process using the light table apparatus 30 dispenses completely with the need for dye penetrant materials and dwell times, thereby making inspections more labor and time-efficient while also providing the precision and accuracy improvements noted above.

Figure 7:
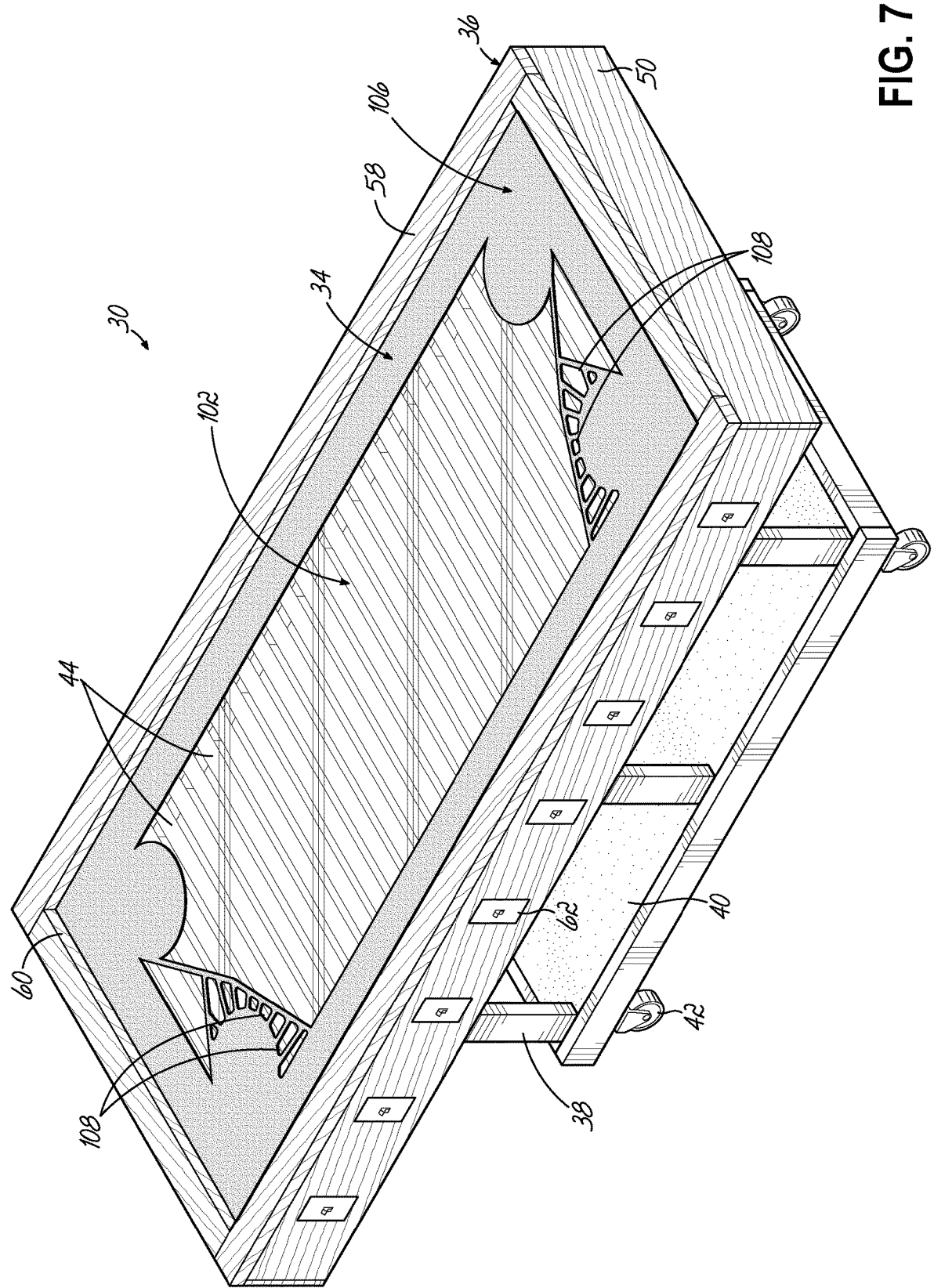
FIG. 7 is a top perspective view of the light table of FIG. 2 in combination with a gasket-like template placed on top of the light table and configured to engage with a specific heat exchanger plate design to block undesired transmission of light through or around peripheral portions of the plate.
Figure 8:
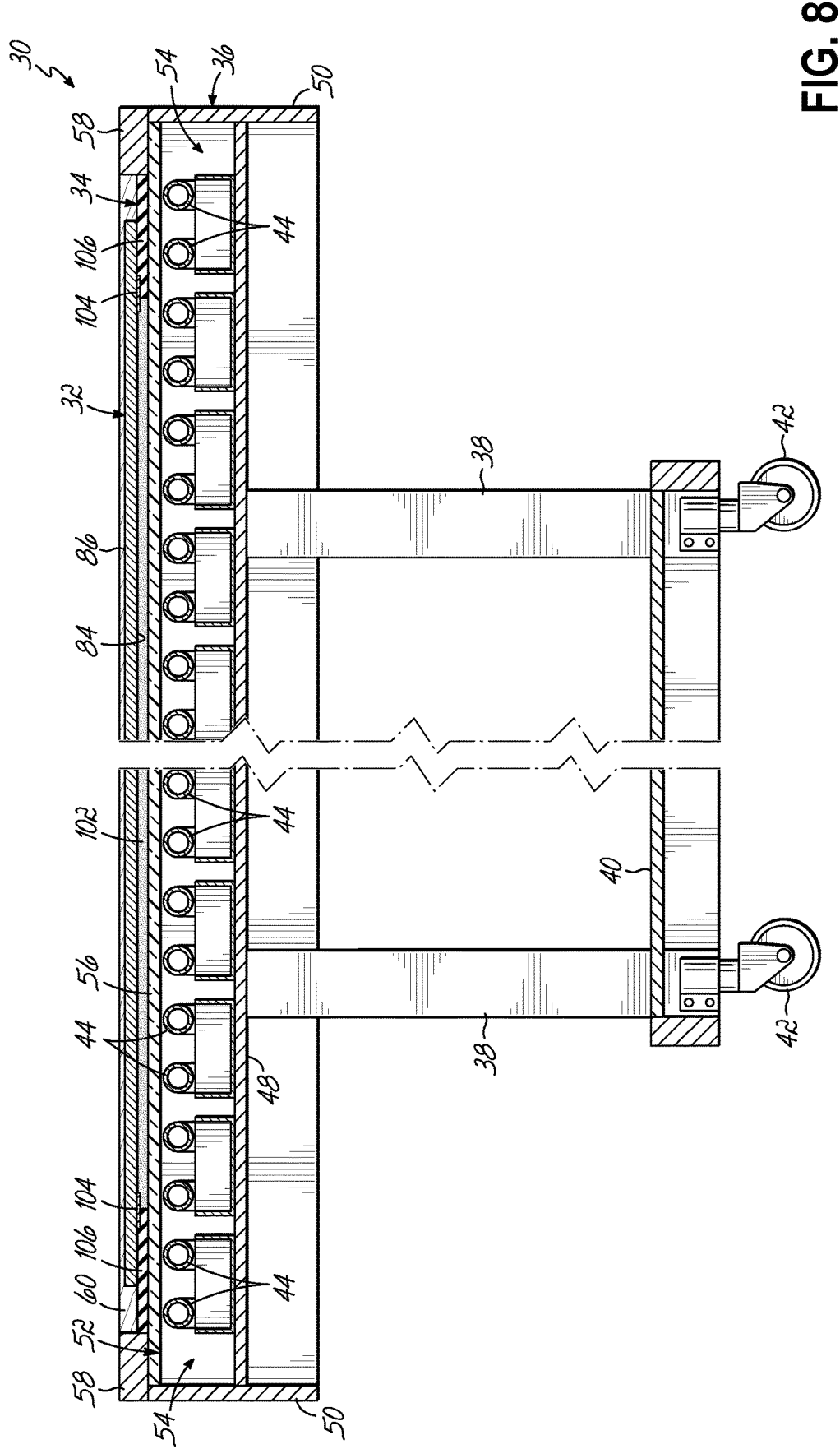
FIG. 8 is a side cross-sectional view of the light table of FIG. 7, with both the gasket-like template and a heat exchanger plate positioned on top of the light table as would be the case during a defect detection process using the light table.

Another type of embodiment of the light table apparatus 30 is shown in FIGS. 7 through 10, with the same reference numbers used on the same elements where largely unchanged from the previously-described embodiment. In this embodiment, the light shielding element of the light table apparatus 30 is defined by a gasket-like template 34 that is customized for the particular type of heat exchanger plate 32 to be inspected. In FIGS. 7 and 8, for example, the gasket-like template 34 is large in size to be concurrent in size with the large heat exchanger plate 32 shown in previous drawing views. The gasket-like template 34 is typically positioned on top of the top wall 52 of the support frame 36 before the heat exchanger plate 32 is manually positioned on top of the support frame 36, and so in FIG. 7, the template 34 has been placed in position to show its features before the heat exchanger plate 32 is added. The gasket-like template 34 of FIG. 7 largely fills the entirety of the receiving space 60 on top of the light-transmissive panel 56, although this shape and size can change based on the heat exchanger plate 32 design to be inspected using the template 34.

As most clearly seen in FIG. 8, the gasket-like template 34 includes a light-transmissive base panel 102, which like the light-transmissive panel 56 on the support frame 36, can be made of a Plexiglass sheet in one example for visibility and durability. The light-transmissive base panel 102 is the portion of the template 34 that is largely consistent in size with the heat exchanger plate 32 to be inspected. The gasket-like template 34 also includes a resilient light seal 104 that is typically formed from a rubber-like gasket material, similar to the materials used for sealing gaskets within the heat exchanger. The resilient light seal 104 is only clearly shown in FIG. 8, but it will be understood that it may project above the surface of the base panel 102 when the gasket-like template 34 is in the position shown in FIG. 7.

The resilient light seal 104 is specifically shaped just like the sealing gasket within the heat exchanger that would abut this side of the heat exchanger plate 32 in use within the heat exchanger, and would therefore engage with the sealing groove 80 on the plate 32 as described above. Additionally, peripheral portions of the base panel 102 that are located circumferentially outwardly from where the resilient light seal 104 is positioned are painted or coated with a light-blocking material 106 such as a black paint or some other solid black material (the latter being adhered, for example, to the surfaces of the base panel 102 at these locations). This set of options for the light-blocking material is also why the resilient light seal 104 cannot be seen in the schematic overview perspective of FIG. 7, as it may be closely positioned next to the light-blocking material on a circumferentially outward direction thereof. Thus, the gasket-like template 34 as a whole is configured as a light shielding element to block all unwanted transmissions of light energy from passing around or through peripheral portions 74 of the heat exchanger plate 32 during inspections according to the present invention.

As with the previous embodiment, it is made clear in FIG. 7 how the gasket-like template 34 works successfully as a light shielding element. To this end, the illumination units 44 within the support frame 36 are visible through the base panel 102 and through the light-transmissive panel 56 of the top wall 52 in this view, but only along portions of the heat exchanger plate 32 that are to be inspected for defects. Any of the peripheral portions 74 of the plate 32, including most notably the apertures 78 that serve as primary inlets and outlets, are blocked by the resilient light seal 104 and by the light-blocking material 106 on the template 34. The gasket-like template 34 may be used in conjunction with separate circular blocking gaskets 66 as described above in the prior embodiment for preventing light energy passage through the apertures 78, but it will be understood that such blocking gasket shape may also just be incorporated as a part of the resilient light seal 104 as well. Furthermore, the resilient light seal 104 can include divided portions 108 adjacent the circular blocking gaskets 66 that are specifically shaped and sized to engage with the corrugated contour 82 along peripheral portions 74 of the heat exchanger plate 32.

As such, the gasket-like template 34 effectively blocks all paths for undesired light energy transmission or escape except through the central portion 70 of the heat exchanger plate 32, working thus in a similar fashion as the combination of the edge mats 64 and additional blocking gaskets 66 in the previous embodiment. It is typical for many identical plates 32 to be inspected for a single heat exchanger, and by providing the template 34, the user can be even more efficient at conducting defect inspections because the edge mats 64 and separate blocking gaskets 66 do not need repositioned for each plate 32; instead, once the template 34 is in position on the support frame 36, only the plate 32 needs to be moved into and out of engagement with the light table apparatus 30 between inspections. Of course, if a user desires even more assurance against light energy leakage around the peripheral portions 74 of heat exchanger plates 32, the edge mats 64 previously described may also be used in conjunction with the gasket-like template 34 in other embodiments of the invention, even though the template 34 is specifically designed to obviate the need for separate edge mats 64 or the like.

The inspection method using the light table apparatus 30 of FIGS. 7 and 8 is now described in further detail. First, the gasket-like template 34 is positioned manually by a user on top of the support frame 36, and specifically on top of the light-transmissive panel 56 at the top wall 52 thereof. The template 34 is positioned with the base panel 102 abutting the top wall 52 of support frame 36 and with the resilient light seal 104 facing upwardly. The heat exchanger plate 32 is then positioned manually by a user on top of the gasket-like template 34 as shown in FIG. 8. During this positioning of the plate 32, the resilient light seal 104 is engaged with contours defined along the peripheral portions 74 of the heat exchanger plate 32. To this end, the resilient light seal 104 engages, so as to circumferentially surround on the one side 84 of the heat exchanger plate 32 facing towards the template 34, the central portion 70 of the plate 32 and any corrugations 72 on that central portion 70. This configuration as shown in FIG. 8 allows the gasket-like template 34 to block all light transmission or escape from passing through or around the peripheral portions 74 of the heat exchanger plate 32. As a result, the inspection method then proceeds with darkening an ambient environment around the light table apparatus 30 and operating the illumination units 44 within the support frame 36, which irradiates the one side 84 of the plate 32 at the central portion 70. The user then visually inspects with their eyes the opposite side 86 of the heat exchanger plate 32 at the central portion 70 to look for any light transmissions or escapes through the central portion 70. If any fluid-transmitting defects are present in the central portion 70, such defects will be illuminated clearly and visibly by light energy transmission through the defects, such illumination allowing the user to accurately identify and locate all such defects that may be present in the heat exchanger plate 32. As set forth above, defects having a cross-dimension of 15 microns or more are reliably identified using the inspection method of this invention.

Figure 9:
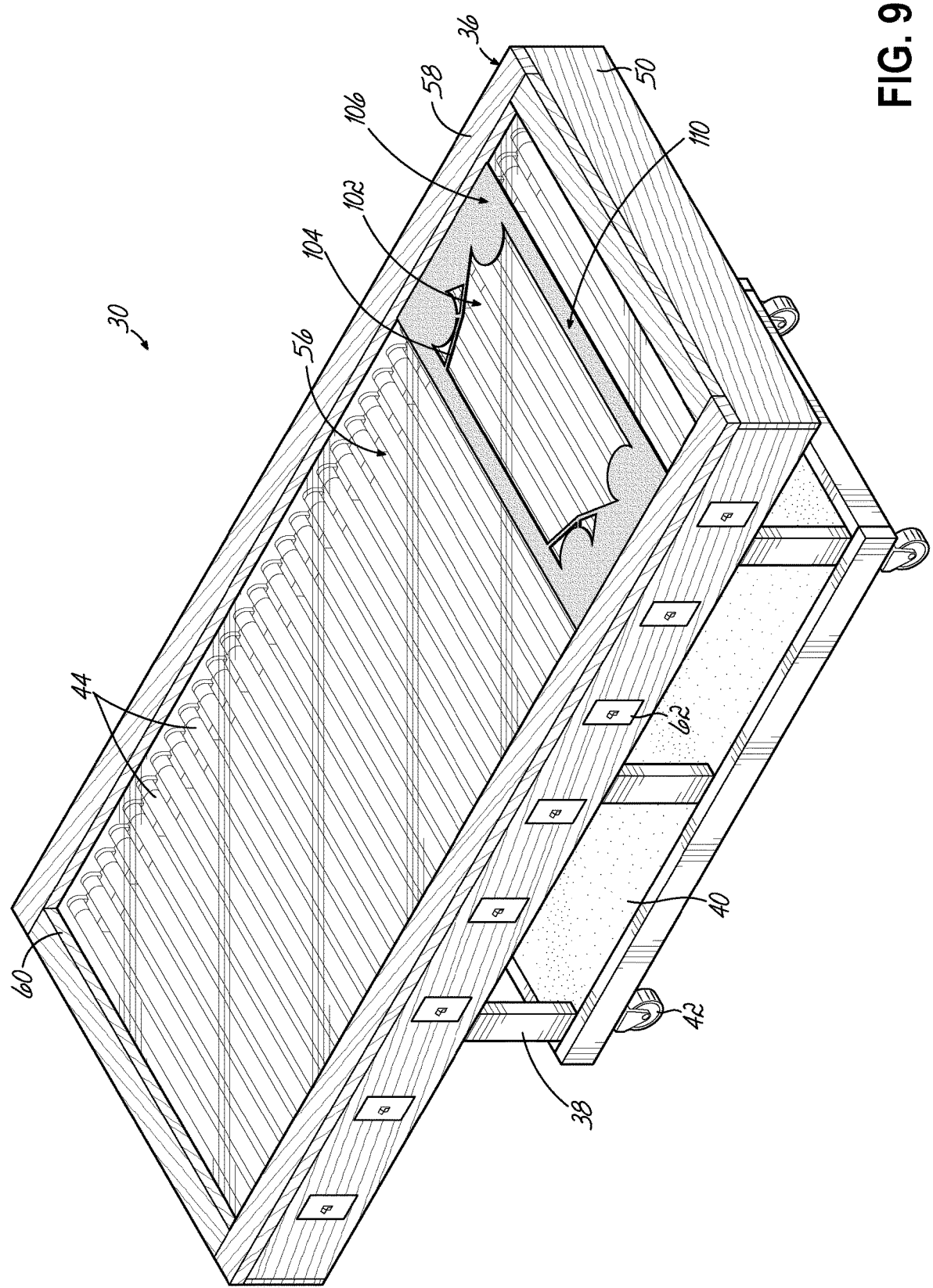
FIG. 9 is a top perspective view of the light table of FIG. 2 in combination with another embodiment of a gasket-like template placed on top of the light table.
Figure 10:
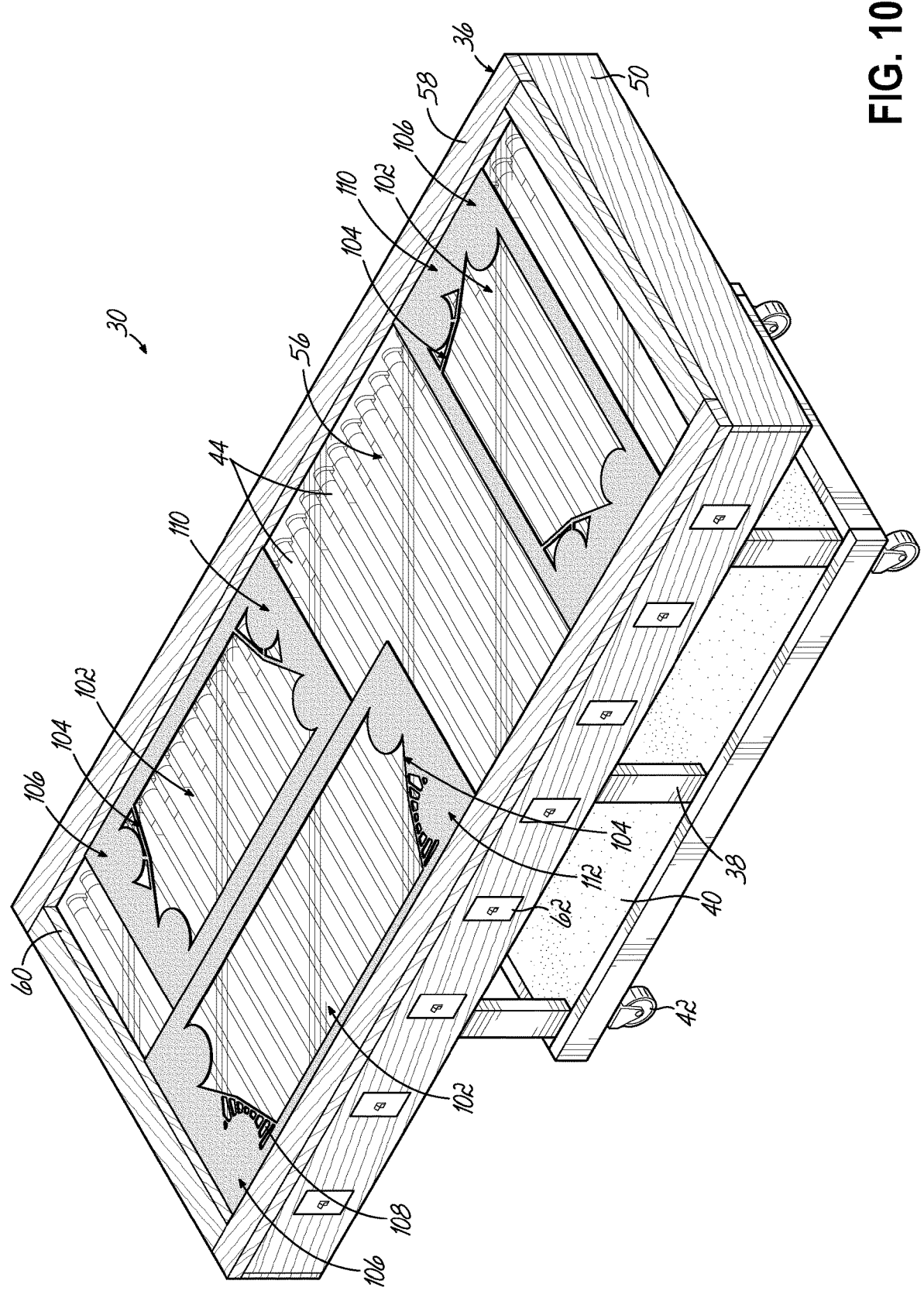
FIG. 10 is a top perspective view of the light table of FIG. 2 in combination with a plurality of further embodiments of a gasket-like template, each of which is simultaneously placed on top of the light table.

Further embodiments of the inspection method and alternative versions of the gasket-like templates are shown in FIGS. 9 and 10. In this regard, the light table apparatus 30 is the same as previously described in these prior Figures, but it is used with one or more smaller gasket-like templates 110, 112. The gasket-like templates 110, 112 of these Figures are configured in size for smaller heat exchanger plates that may be inspected for fluid-transmitting defects. However, each of the gasket-like templates 110, 112 continues to include the similar features of a light-transmissive base panel 102, a resilient light seal 104, and light-blocking material 106 applied to the peripheral portions of the base panel 102, all of which collectively prevent or block undesired light energy transmission through or around peripheral portions of the corresponding heat exchanger plates. In FIG. 9, only one gasket-like template 110 is used, and this is an embodiment where the plurality of light switches 62 in the control mechanism can be used to selectively illuminate (with an individual one or a partial portion of illumination units 44) only the area underneath the smaller gasket-like template 110. Covering mats may be used adjacent to the gasket-like template 110 to prevent further light energy escape from around the smaller gasket-like template 110, if desired. In FIG. 10, multiple gasket-like templates 110, 112 are positioned within the receiving space 60 so that multiple smaller heat exchanger plates can be inspected after they are placed in engagement with the corresponding gasket-like templates 110, 112. This can add further efficiencies to the inspection process when manually inspecting a high number of smaller in size heat exchanger plates for defects.

Figure 11:
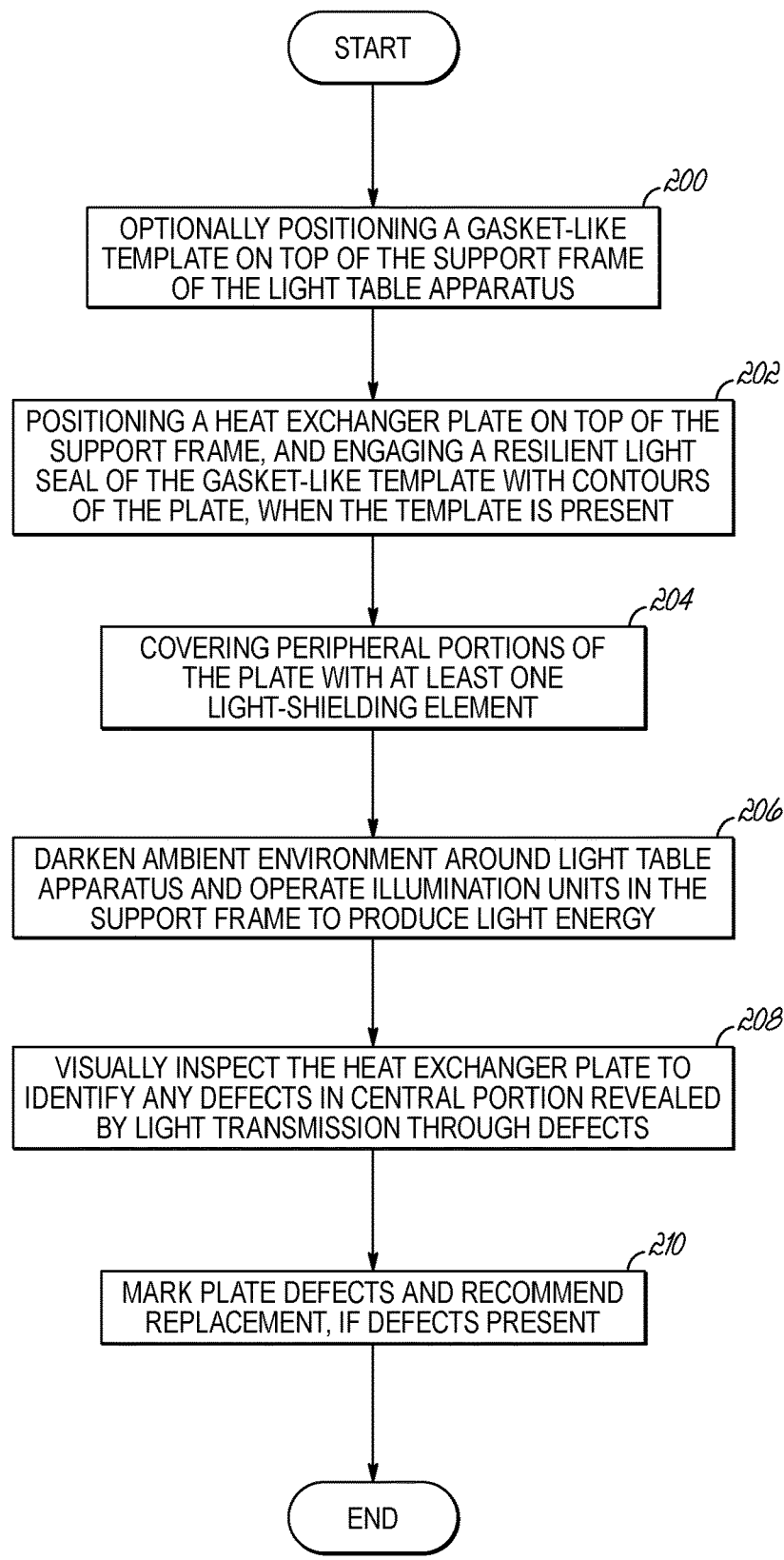
FIG. 11 is a schematic flowchart showing an inspection process using a light table apparatus, in accordance with the embodiments of the present invention.

A more generalized process flowchart is provided at FIG. 11 to summarize the inspection methods provided by the light table apparatus 30 and by embodiments of the present invention. First, in a step 200, the gasket-like template 34, 110, 112 is optionally positioned on top of the support frame 36 of the light table apparatus 30. This step 200 is listed as optional because it is only used in embodiments where the gasket-like template 34 is provided, as in FIGS. 7 through 10 (this advantageously makes the preparation of inspection much easier and quicker when appropriate templates are available, as noted above). Next, the heat exchanger plate 32 is positioned on top of the support frame 36 at a step 202. If step 200 was performed, then step 202 also includes engaging the resilient light seal 104 of the template 34 with contours of the heat exchanger plate 32. In embodiments where the template 34 is not provided, like FIGS. 2 through 4, the heat exchanger plate 32 sits directly on top of the light-transmissive panel 56 at the top wall 52 of the support frame 36 (in all cases, the plate 32 is positioned within the receiving space 60 in this step 202). Then, in a step 204, peripheral portions 74 of the heat exchanger plate 32 are covered with at least one light shielding element. This light shielding element may be a separately added set of edge mats 64 and blocking gaskets 66 as shown in FIG. 4, or it may be the portions of the template 34 including the resilient light seal 104 and the light-blocking material 106. Each of steps 200, 202, 204 are typically completed manually by a user at the light table apparatus 30.

After that, in a step 206, the user darkens the ambient environment around the light table apparatus 30 and uses the control mechanism to operate one or more of the illumination units 44 within the support frame 36, which produces light energy and irradiates one side 84 of the plate 32 along a central portion 70. The user then, at a step 208, visually inspects the opposite side 86 of the heat exchanger plate 32 to identify any defects in the central portion 70 that have been revealed by light transmission through the fluid-transmitting defects. Finally, the user, at a step 210, can physically mark the plate 32 at the location of the defects (e.g., with a marker or the like so as to send evidence of the defects to the heat exchanger owner, if necessary) and recommend replacement of the heat exchanger plate 32 when defects are present. This ends the inspection process, and the user may start over by removing the heat exchanger plate 32 and/or the gasket-like template 34 from the light table apparatus 30 and then start over back at step 200.

In summary, inspections of heat exchanger plates 32 for fluid-transmitting defects using the light table apparatus 30 according to embodiments of this invention are significantly improved from the dye penetrant testing currently done for such defect testing in this field. The light table apparatus 30 can adjust the lighted area with selective activation of illumination units 44 and with use of various light shielding elements to focus light energy and irradiate generally only the central portion 70 of any size or shape heat exchanger plate 32. This permits a visual inspection manually by a user's eyes on an opposite side of the heat exchanger plate 32 for any light emissions indicative of a fluid-transmitting defect in the plate 32, and such light emissions will be easy to spot when the ambient environment is darkened as noted in the inspection methods described herein. The inspection methods using the light table apparatus 30 can be fully manually done with higher precision (detecting defects as small as 15 microns across in cross dimension) and accuracy than known manual testing methods. Moreover, such inspection is reliably done without any need for automated equipment such as automated image capturing equipment or image processing. Labor and materials costs are also reduced because the use of dye penetrant and dwell time, spray time, and cleaning time are all eliminated. Particularly when combined with use of the gasket-like templates 34 in some embodiments tailored for certain sizes and types of heat exchanger plates 32, inspection for fluid-transmitting defects can be rapidly done in a quicker and improved manner.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope of the Applicant's general inventive concept.

What is claimed is:

1. An inspection method for detecting fluid-transmitting defects in a heat exchanger plate, the method comprising:

manually positioning a heat exchanger plate on top of a support frame of a light table apparatus, the support frame containing a plurality of illumination units configured to produce light energy;

covering peripheral portions of the heat exchanger plate with at least one light-shielding element, wherein the peripheral portions surround a central portion of the heat exchanger plate that is to be inspected for defects, and the at least one light-shielding element is configured to block light energy transmission around or through the peripheral portions of the heat exchanger plate;

darkening an ambient environment around the light table apparatus and operating one or more of the plurality of illumination units to produce light energy and thereby irradiate one side of the central portion of the heat exchanger plate that faces towards the top of the support frame;

manually visually inspecting an opposite side of the central portion of the heat exchanger plate while the ambient environment is darkened and the plurality of illumination units are operated, wherein light energy from the plurality of illumination units will escape through the central portion of the heat exchanger plate only through fluid-transmitting defects present in the central portion and thereby will illuminate such defects in a manner detectable by eyes of a user performing the manually visually inspecting step, to allow the user to accurately identify and locate any such defects in the heat exchanger plate.

2. The method of claim 1, wherein the at least one light-shielding element includes a gasket-like template including a light-transmissive base panel and a resilient light seal coupled to the base panel, and the step of covering peripheral portions of the heat exchanger plate with the at least one light-shielding element further comprises:

manually positioning the gasket-like template on top of the support frame of the light table apparatus, with the resilient light seal facing upwardly away from the support frame, before the step of manually positioning the heat exchanger plate; and engaging the resilient light seal with contours defined along the peripheral portions of the heat exchanger plate as the heat exchanger plate is positioned on top of the support frame, such that the central portion and corrugations located on the central portion are circumferentially surrounded along the one side of the heat exchanger plate that faces towards the gasket-like template and towards the support frame, wherein portions of the base panel located circumferentially outwardly from the resilient light seal are painted or coated with a light-blocking material to further assist with blocking of light energy transmission around or through the peripheral portions of the heat exchanger plate.

3. The method of claim 2, wherein the heat exchanger plate includes apertures at the peripheral portions configured to serve as fluid inlets and outlets during use in a heat exchanger, and the step of covering peripheral portions of the heat exchanger plate with the at least one light-shielding element further comprises:
    inserting circular blocking gaskets, which are included in the at least one light-shielding element, into the apertures of the heat exchanger plate to further block light transmission through the apertures and through the peripheral portions of the heat exchanger plate.

4. The method of claim 3, wherein the heat exchanger plate includes a corrugated contour extending between the apertures and the central portion, and the step of engaging the resilient light seal with the heat exchanger plate further comprises:
    engaging divided portions of the resilient light seal with the corrugated contour to block light transmission between the central portion and the apertures of the heat exchanger plate.

5. The method of claim 1, wherein the at least one light-shielding element includes a plurality of edge mats formed from a non-light-transmissive material, and the step of covering peripheral portions of the heat exchanger plate with the at least one light-shielding element further comprises:
    manually positioning the plurality of edge mats to overlap at least peripheral edges of the heat exchanger plate along the peripheral portions thereof, the edge mats thereby preventing light energy from transmitting through or around the peripheral edges and peripheral portions of the heat exchanger plate.

6. The method of claim 5, wherein the heat exchanger plate includes apertures at the peripheral portions configured to serve as fluid inlets and outlets during use in a heat exchanger, and the step of covering peripheral portions of the heat exchanger plate with the at least one light-shielding element further comprises:
    inserting circular blocking gaskets, which are included in the at least one light-shielding element, into the apertures of the heat exchanger plate to further block light transmission through the apertures and through the peripheral portions of the heat exchanger plate,
    wherein the plurality of edge mats may be positioned spaced apart from, partially overlapping with, or fully overlapping with the circular blocking gaskets.

7. The method of claim 1, wherein the light table apparatus further includes wheels and legs connected to and extending downwardly from the support frame towards the wheels, and the method further comprises:
    rolling the light table apparatus using the wheels into position in an environment that can be darkened for testing heat exchanger plates for fluid-transmitting defects.

8. The method of claim 1, wherein the light table apparatus further includes a control mechanism with a plurality of switches operatively connected to individual ones of the plurality of illumination units, and the step of operating one or more of the plurality of illumination units to produce light energy further comprises:
    activating, using the switches, a partial portion of the plurality of illumination units to vary a size of an area of illumination of the top of the support frame that is irradiated with light energy, to thereby tailor the size of the area of illumination to a size of the heat exchanger plate to be inspected for fluid-transmitting defects.

9. The method of claim 8, wherein the step of operating one or more of the plurality of illumination units to produce light energy further comprises:
    generating at least 100,000 lumens of light energy when all of the plurality of illumination units are activated by the control mechanism.

10. The method of claim 1, wherein the step of manually visually inspecting the heat exchanger plate further comprises:
    successfully identifying and locating any pinholes, cracks, or other fluid-transmitting defects having a cross-dimension as small as 15 microns or more, as a result of illumination of such defects caused by light passage through such defects.

11. The method of claim 1, wherein the method does not include any step of spraying or coating the heat exchanger plate with a dye penetrant or other coating before manually visually inspecting the heat exchanger plate, and the method therefore also does not include any step of washing the dye penetrant or other coating off the heat exchanger plate after inspection, wherein the method does not include any automated image capture or image processing to determine where fluid-transmitting defects are located on the heat exchanger plate.

12. An inspection method for detecting fluid-transmitting defects in a heat exchanger plate, the method comprising:
    positioning a heat exchanger plate on top of a support frame of a light table apparatus, the support frame containing a plurality of illumination units configured to produce light energy, and the heat exchanger plate including peripheral portions surrounding a central portion;
    positioning a gasket-like template on top of the support frame of the light table apparatus before the step of positioning the heat exchanger plate, the gasket-like template including a light-transmissive base panel and a resilient light seal coupled to the base panel and facing upwardly away from the support frame, wherein the gasket-like template is configured to block light energy transmission around or through the peripheral portions of the heat exchanger plate;
    engaging the resilient light seal with contours defined along the peripheral portions of the heat exchanger plate as the heat exchanger plate is positioned on top of the support frame, such that the central portion and corrugations located on the central portion are circumferentially surrounded along one side of the heat exchanger plate that faces towards the gasket-like template and towards the support frame;
    darkening an ambient environment around the light table apparatus and operating one or more of the plurality of illumination units to produce light energy and thereby irradiate the one side of the central portion of the heat exchanger plate that faces towards the top of the support frame;
    visually inspecting an opposite side of the central portion of the heat exchanger plate while the ambient environment is darkened and the plurality of illumination units are operated, wherein light energy from the plurality of illumination units will escape through the central portion of the heat exchanger plate only through fluid-transmitting defects present in the central portion and thereby will illuminate such defects in a manner that enables accurate identification and location of any such defects in the heat exchanger plate.

13. The method of claim 12, wherein portions of the base panel of the gasket-like template located circumferentially outwardly from the resilient light seal are painted or coated with a light-blocking material to assist with blocking of light energy transmission.

14. The method of claim 12, wherein the heat exchanger plate includes apertures at the peripheral portions configured to serve as fluid inlets and outlets during use in a heat exchanger, and the method further comprises:
inserting circular blocking gaskets into the apertures of the heat exchanger plate to further block light transmission through the apertures and through the peripheral portions of the heat exchanger plate,
wherein the heat exchanger plate includes a corrugated contour extending between the apertures and the central portion, and the step of engaging the resilient light seal with the heat exchanger plate further comprises:
engaging divided portions of the resilient light seal with the corrugated contour to block light transmission between the central portion and the apertures of the heat exchanger plate.

15. The method of claim 12, wherein the light table apparatus further includes a control mechanism with a plurality of switches operatively connected to individual ones of the plurality of illumination units, and the step of operating one or more of the plurality of illumination units to produce light energy further comprises:
activating, using the switches, a partial portion of the plurality of illumination units to vary a size of an area of illumination of the top of the support frame that is irradiated with light energy, to thereby tailor the size of the area of illumination to a size of the heat exchanger plate to be inspected for fluid-transmitting defects.

16. The method of claim 12, wherein the step of visually inspecting the heat exchanger plate further comprises:
successfully identifying and locating any pinholes, cracks, or other fluid-transmitting defects having a cross-dimension as small as 15 microns or more, as a result of illumination of such defects caused by light passage through such defects.

17. A light table apparatus for detection of fluid-transmitting defects in a heat exchanger plate, the light table apparatus comprising:
a support frame defining an enclosed space, the support frame including a bottom wall and sidewalls defined by a non-light-transmissive material and a top wall defined by a light-transmissive panel, the top wall being sized to receive an entirety of one or more heat exchanger plates laid manually by a user onto the light-transmissive panel so as to be tested for defects;
a plurality of illumination units enclosed within the enclosed space of the support frame;
a control mechanism for selectively operating one or more of the plurality of illumination units to irradiate light energy through the light-transmissive panel at the top wall; and
at least one light shielding element positioned in engagement with the heat exchanger plate by the user when the heat exchanger plate is positioned onto the light-transmissive panel, the at least one light shielding element configured to block light energy transmission around or through peripheral portions of the heat exchanger plate such that light energy irradiated from the plurality of illumination units is directed to one side of a central portion of the heat exchanger plate, which faces towards the support frame,
wherein when the heat exchanger plate and the at least one light shielding element are placed on top of the support frame, and the plurality of illumination units are activated to produce light energy, an environment surrounding the light table apparatus can be darkened and light energy will escape only through defects in the central portion of the heat exchanger plate such that a user visually inspecting an opposite side of the central portion of the heat exchanger plate, which faces away from the support frame, will be able to identify and locate any defects revealed by such transmission of light energy through the defects in the heat exchanger plate.

18. The light table apparatus of claim 17, wherein the heat exchanger plate includes corrugations along the central portion, and the at least one light shielding element further comprises:
a gasket-like template including a light-transmissive base panel that is generally concurrent in size with the heat exchanger plate to be inspected and a resilient light seal coupled to the base panel, the resilient light seal being shaped to engage with contours defined along the peripheral portions of the heat exchanger plate to thereby surround circumferentially the central portion and its corrugations along the one side of the heat exchanger plate that faces towards the gasket-like template and towards the support frame,
wherein portions of the base panel located circumferentially outwardly from the resilient light seal are painted or coated with a light-blocking material to further assist with blocking of light energy transmission around or through the peripheral portions of the heat exchanger plate.

19. The light table apparatus of claim 18, wherein the base panel of the gasket-like template is formed from plexiglass material, the resilient light seal is formed from rubber material, and the light-blocking material is defined by a black paint or a solid black material adhered to the base panel.

20. The light table apparatus of claim 18, wherein the heat exchanger plate to be inspected includes apertures at the peripheral portions configured to serve as fluid inlets and outlets during use in a heat exchanger, and wherein the at least one light shielding element further comprises:
circular blocking gaskets sized to be inserted into the apertures of the heat exchanger plate to further block light transmission through the apertures and through the peripheral portions of the heat exchanger plate,
wherein the heat exchanger plate includes a corrugated contour positioned between the apertures and the central portion, and the resilient light seal includes divided portions engaging with the corrugated contour to block light transmission between the central portion and the apertures.

21. The light table apparatus of claim 17, wherein the at least one light shielding element further comprises:
a plurality of edge mats positioned to overlap at least peripheral edges of the heat exchanger plate along the peripheral portions thereof, with each of the edge mats being formed from a non-light-transmissive material so as to block light transmission around the peripheral portions and the peripheral edges of the heat exchanger plate, wherein the heat exchanger plate to be inspected includes apertures at the peripheral portions configured to serve as fluid inlets and outlets during use in a heat exchanger, and wherein the at least one light shielding element further comprises:

circular blocking gaskets sized to be inserted into the apertures of the heat exchanger plate to further block light transmission through the apertures and through the peripheral portions of the heat exchanger plate, wherein the plurality of edge mats may be positioned spaced apart from, partially overlapping with, or fully overlapping with the circular blocking gaskets.

22. The light table apparatus of claim 17, wherein the support frame is connected to legs extending downwardly from the bottom wall and to a set of wheels, the wheels configured to enable the light table apparatus to be moved to a location that can be selectively darkened for conducting inspections of the heat exchanger plate.

23. The light table apparatus of claim 17, wherein the control mechanism further includes a plurality of switches mounted on the support frame and connected to individual ones of the plurality of illumination units, the plurality of switches configured to allow users to selectively illuminate all or a partial portion of the plurality of illumination units to vary an area of the light-transmissive panel at the top wall that receives light energy for testing various sizes of heat exchanger plates that may be placed on the top wall.

24. The light table apparatus of claim 17, wherein the support frame is formed from wood material as the non-light-transmissive material and formed from plexiglass material as the light-transmissive panel, and wherein the plurality of illumination units are collectively configured to output at least 100,000 lumens of light energy when activated.

25. The light table apparatus of claim 17, wherein the light table apparatus is configured such that during operation in a darkened environment to inspect for defects in the heat exchanger plate, any pinholes, cracks, or other fluid-transmitting defects having a cross-dimension as small as 15 microns or more will be illuminated by light passage at such defects in such a manner as to be successfully identifiable by a user manually inspecting the heat exchanger plate.

* * * * *